United States Patent
Kim et al.

(10) Patent No.: US 7,750,829 B2
(45) Date of Patent: Jul. 6, 2010

(54) SCALABLE ENCODING AND/OR DECODING METHOD AND APPARATUS

(75) Inventors: Jung-hoe Kim, Seongnam-si (KR); Eun-mi Oh, Seongnam-si (KR); Ki-hyun Choo, Seoul (KR); Boris Kudryashov, Valadivostok (RU); Olga Prokofyeva, Valadivostok (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/061,028

(22) Filed: Apr. 2, 2008

(65) Prior Publication Data
US 2009/0073008 A1 Mar. 19, 2009

(30) Foreign Application Priority Data
Sep. 17, 2007 (KR) .................. 10-2007-0094357

(51) Int. Cl.
*H03M 7/40* (2006.01)
(52) U.S. Cl. .................................. 341/67; 341/107
(58) Field of Classification Search ............. 341/50, 341/51, 59, 65, 67, 107; 375/240.3, 240.21, 375/240.16
See application file for complete search history.

(56) References Cited

U.S. PATENT DOCUMENTS

| | | | | |
|---|---|---|---|---|
| 6,363,119 B1* | 3/2002 | Oami | ............. | 375/240.03 |
| 7,190,284 B1* | 3/2007 | Dye et al. | ............. | 341/51 |
| 7,272,567 B2* | 9/2007 | Fejzo | ............. | 704/500 |
| 7,523,039 B2* | 4/2009 | Manu | ............. | 704/501 |
| 2003/0171919 A1* | 9/2003 | Kim et al. | ............. | 704/229 |

\* cited by examiner

*Primary Examiner*—Brian Young
(74) *Attorney, Agent, or Firm*—Stanzione & Kim, LLP

(57) ABSTRACT

A method and apparatus to scalably encode or decode an audio signal or a video signal. A signal distribution is considered after binarization is performed based on a tree structure. Thus, a decoding end can minimize generation of quantization errors and restore an original signal. In addition, only frequency components perceptually important in terms of human hearing are set to an upper layer and encoded without decreasing a bandwidth which is restored from an upper layer. Therefore, sound quality can be increased by decreasing quantization noise while maintaining a relatively large frequency bandwidth, and the degradation of a compression performance is prevented.

43 Claims, 11 Drawing Sheets

SCALABLE ENCODING AND/OR DECODING METHOD AND APPARATUS

CROSS-REFERENCE TO RELATED APPLICATIONS

This application claims the benefit and priority under 35 U.S.C. §119(a) of Korean Patent Application No. 10-2007-0094357, filed on Sep. 17, 2007, in the Korean Intellectual Property Office, the disclosure of which is incorporated herein in its entirety by reference.

BACKGROUND OF THE INVENTION

1. Field of the Invention

The present general inventive concept relates to a method and apparatus encode and/or decode audio signals or video signals, and more particularly, to a method and apparatus to scalably encode and/or decode audio signals or video signals.

2. Description of the Related Art

An audio signal or a video signal can be encoded into a plurality of layers by controlling a bit rate by providing scalability. When a network becomes overloaded because of the encoding of an audio signal or a video signal into a plurality of layers, when a decoder cannot perform decoding, or when a bit rate is decreased according to a user's setting, the sound or image quality decreases, but the original signal can be restored by using only a part of a bitstream that corresponds to some of the layers.

Examples of important factors for providing scalability include transformation, quantization, bit-plane coding, data reordering, etc. Because of a tradeoff relationship between coding efficiency and the sound or image quality, when the coding efficiency is increased, the sound or image quality is decreased. On the other hand, when the coding efficiency is decreased, the sound or image quality is increased. In order to increase coding efficiency, an overhead caused by scalability should be small. In order to increase the sound or image quality, transformation, quantization, data reordering, etc. should be optimized. Therefore, the coding efficiency and the sound or image quality have opposite characteristics, and accordingly encoding that appropriately satisfies both the coding efficiency and the sound or image quality is needed.

In a codec that provides scalability on the basis of bit-plane coding and data reordering, the number of calculations to be executed is decreased but the quality of sound at low layers rapidly decreases. More specifically, when bit-plane coding is applied, quantization noise is increased by undecoded symbols. In addition, due to a lack of bits to be transmitted in low layers, a bandwidth that can be restored is decreased as layers become lower, and a muffled sound is generated. Therefore, the sound quality at low layers rapidly decreases.

SUMMARY OF THE INVENTION

The present general inventive concept provides a method and apparatus to scalably encode and/or decode audio signals or video signals.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a scalable encoding method including generating symbols by quantizing an input signal; extracting codewords corresponding to the symbols from among codewords prepared so as to have variable lengths according to a distribution of probabilities of codes and to correspond to a plurality of prepared symbols, dividing each of the extracted codewords in units of a predetermined length in an order from an upper bit to a lower bit and grouping the divided codewords, and scalably lossless-encoding the grouped codewords.

The foregoing and/or other aspects and utilities of the present general inventive concept may also be achieved by providing a scalable decoding method including lossless decoding scalably encoded codes, extracting symbols by restoring codewords by arranging the lossless decoded codes, restoring symbols corresponding to codes from which symbols cannot be extracted, using a distribution of probabilities of codes that can be provided to lower bits of the arranged codes, and dequantizing the extracted or restored symbols.

The foregoing and/or other aspects and utilities of the present general inventive concept may also be achieved by providing a computer readable recording medium having recorded thereon a computer program to execute a scalable encoding method including generating symbols by quantizing an input signal; extracting codewords corresponding to the symbols from among codewords prepared so as to have variable lengths according to a distribution of probabilities of codes and to correspond to a plurality of prepared symbols, dividing each of the extracted codewords in units of a predetermined length in the order from an upper bit to a lower bit and grouping the divided codewords, and scalably lossless-encoding the grouped codewords.

The foregoing and/or other aspects and utilities of the present general inventive concept may also be achieved by providing a computer readable recording medium having recorded thereon a computer program to execute a scalable decoding method including lossless decoding scalably encoded codes, extracting symbols by restoring codewords by arranging the lossless decoded codes, restoring symbols corresponding to codes from which symbols cannot be extracted, using a distribution of probabilities of codes that can be provided to lower bits of the arranged codes, and dequantizing the extracted or restored symbols.

The foregoing and/or other aspects and utilities of the present general inventive concept may also be achieved by providing a scalable encoding apparatus including a quantization unit to generate symbols by quantizing an input signal; a codeword extraction unit to extract codewords corresponding to the symbols from among codewords prepared so as to have variable lengths according to a distribution of probabilities of codes and to correspond to a plurality of prepared symbols, a grouping unit to divide each of the extracted codewords in units of a predetermined length in an order from an upper bit to a lower bit and to group the divided codewords, and a lossless encoding unit to scalably lossless-encode the grouped codewords.

The foregoing and/or other aspects and utilities of the present general inventive concept may also be achieved by providing a scalable decoding apparatus including a lossless decoding unit to lossless decode scalably encoded codes, a symbol extraction unit to extract symbols by restoring codewords by arranging the lossless decoded codes, a symbol restoration unit to restore symbols corresponding to codes from which symbols cannot be extracted, using a distribution of probabilities of codes that can be provided to lower bits of the arranged codes, and a dequantization unit to dequantize the extracted or restored symbols.

The foregoing and/or other aspects and utilities of the present general inventive concept may also be achieved by providing a scalable encoding method including selecting frequency components from an input signal according to a predetermined criterion, and selecting frequency components to be included in each layer from the selected frequency components and scalably encoding the selected frequency components for each layer.

The foregoing and/or other aspects and utilities of the present general inventive concept may also be achieved by providing a scalable decoding method including scalably decoding frequency components that have been selected according to a predetermined criterion and encoded for each layer, and restoring a signal from the decoded frequency components.

The foregoing and/or other aspects and utilities of the present general inventive concept may also be achieved by providing a computer readable recording medium having recorded thereon a computer program to execute a scalable encoding method including selecting frequency components from an input signal according to a predetermined criterion, and selecting frequency components to be included in each layer from the selected frequency components and scalably encoding the selected frequency components for each layer.

The foregoing and/or other aspects and utilities of the present general inventive concept may also be achieved by providing a computer readable recording medium having recorded thereon a computer program to execute a scalable decoding method including scalably decoding frequency components that have been selected according to a predetermined criterion and encoded for each layer, and restoring a signal from the decoded frequency components.

The foregoing and/or other aspects and utilities of the present general inventive concept may also be achieved by providing a scalable encoding apparatus including a frequency component selection unit to select frequency components from an input signal according to a predetermined criterion, and a layer encoding unit to select frequency components to be included in each layer from the selected frequency components and to scalably encode the selected frequency components for each layer.

The foregoing and/or other aspects and utilities of the present general inventive concept may also be achieved by providing a scalable decoding apparatus including a frequency component decoding unit to scalably decode frequency components that have been selected according to a predetermined criterion and encoded for each layer, and a signal restoration unit to restore a signal from the decoded frequency components.

The foregoing and/or other aspects and utilities of the present general inventive concept may also be achieved by providing a scalable encoding method including dividing each of components of codewords in order to form one or more groups, and scalably lossless-encoding the groups.

The components may include codes, and the dividing of each of the components of codewords may include dividing each of the codes of the codewords in units of a predetermined length in an order from an upper bit to a lower bit of the codes and grouping the divided codewords.

The scalable encoding method may further include quantizing the input signal to generate symbols, and extracting the codewords corresponding to the symbols from among codewords to have variable lengths according to a distribution of probabilities of codes and to correspond to a plurality of prepared symbols.

The components of the codewords may include a number of bits in order; the groups comprises a first group having first ones of the bits of the respective codewords, and a second group having second ones of the bits of the respective codewords.

The first group may be a base layer, and the second group may be an enhancement layer.

The components may include frequency components, the groups may include one or more layers, and the dividing of each of the components of codewords may include selecting the frequency components from the input signal according to a predetermined criterion, and selecting the frequency components to be included in each layer from the selected frequency components and scalably encoding the selected frequency components for each layer.

Each layer may include a first layer and a second layer having the selected frequency components, the selected frequency components of the first layer may be most perceptually important frequency components, and the selected frequency components of the second layer may be less perceptually important frequency components.

The foregoing and/or other aspects and utilities of the present general inventive concept may also be achieved by providing a scalable decoding method including lossless decoding an input signal of scalably encoded codes to generate one or more groups, and restoring one or more codewords by arranging each of components of the groups in order.

The scalable decoding method may further include restoring symbols according to the restored codewords, and the components may include codes.

The scalable deciding method may further include restoring symbols corresponding to codes of the codewords from which the symbols cannot be extracted, using a distribution of probabilities of codes that can be provided to lower bits of the arranged codes, and quantizing the extracted or restored symbols.

The components of the groups may include a number of bits in order; the codewords may include a first codeword having first ones of the bits of the respective groups, and a second codeword having second ones of the bits of the respective groups.

The first codeword may be a first symbol; and the second codeword may be a second symbol.

The components may include frequency components, the groups may include one or more layers, and the lossless decoding of the input signal and the restoring of the codewords may include scalably decoding the frequency components that have been selected according to a predetermined criterion and encoded for each layer.

The foregoing and/or other aspects and utilities of the present general inventive concept may also be achieved by providing a method of a scalable coding system, the method including encoding an input signal, the encoding of the input signal including dividing each of components of codewords in order to form one or more groups, and scalably lossless-encoding the groups, and decoding a second input signal, the decoding of the second input signal including lossless decoding the input signal of scalably encoded groups to generate one or more groups, and restoring one or more codewords by arranging each of components of the groups in order.

The foregoing and/or other aspects and utilities of the present general inventive concept may also be achieved by providing a scalable coding system, including an encoding apparatus to divide each of components of codewords in order to form one or more groups, and to scalably lossless-encode the groups, and a decoding apparatus to lossless decode the input signal of scalably encoded codes to generate one or more groups, and to restore one or more codewords by arranging each of components of the groups in order.

BRIEF DESCRIPTION OF THE DRAWINGS

The above and other features and advantages of the present general inventive concept will become more apparent by describing in detail exemplary embodiments thereof with reference to the attached drawings in which.

DETAILED DESCRIPTION OF THE PREFERRED EMBODIMENTS

Figure 1:
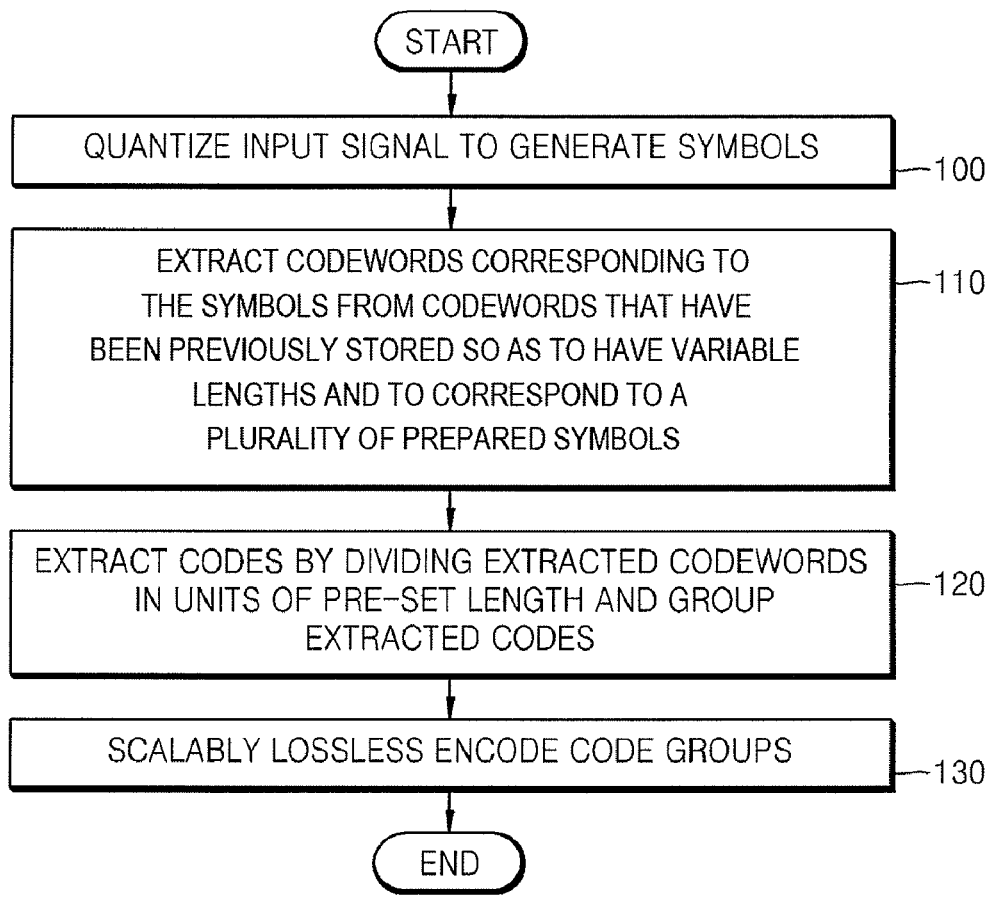
FIG. 1 is a flowchart illustrating a scalable encoding method according to an embodiment of the present general inventive concept.

Scalable encoding and decoding methods and apparatuses according to the present general inventive concept will now be described more fully with reference to the accompanying drawings, in which exemplary embodiments of the general inventive concept are shown.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a flowchart illustrating a scalable encoding method according to an embodiment of the present general inventive concept;

In operation 100, an input signal is quantized to generate symbols.

In operation 110, codewords corresponding to the symbols generated in operation 100 are extracted from codewords that have been previously stored so as to have variable lengths (i.e., variable number of bits of 1 and/or 0) and to correspond to a plurality of prepared symbols. Here, a codeword is a collection of codes that are sequentially arranged. Examples of a code include binary numbers of 0 and 1.

The variable lengths of the previously stored codewords are determined on the basis of the statistical probabilities that symbols are generated. A codeword corresponding to a symbol that is highly likely to be quantized is short, and a codeword corresponding to a symbol that is unlikely to be quantized is long. In other words, a codeword corresponding to a symbol that is statistically frequently quantized can be expressed by using only a small number of bits, whereas a codeword corresponding to a symbol that is statistically rarely quantized should be expressed by using a large number of bits.

In addition, the codewords to be previously stored are formed on the basis of a tree structure in which the probability that each code is prepared is allocated to each node. The probability that each of the codes of a codeword is extracted is calculated using the probability of code extraction allocated to each node in the tree structure, according to Equations 1 and 2.

$$p_i(0) = \frac{p_{i-1}(0)}{p_{i-1}(0) + p_{i-1}(1)} \quad (1)$$

where $P_i(x)$ denotes a probability that x is extracted in an i-th node. Here, a node indicates each code of the codeword, and the i-th node indicates an i-th bit from the MSB of the codeword.

$$p_i(1) = \frac{p_{i-1}(1)}{p_{i-1}(0) + p_{i-1}(1)} \quad (2)$$

where $P_i(x)$ denotes a probability that x is extracted in an i-th node.

Figure 2:
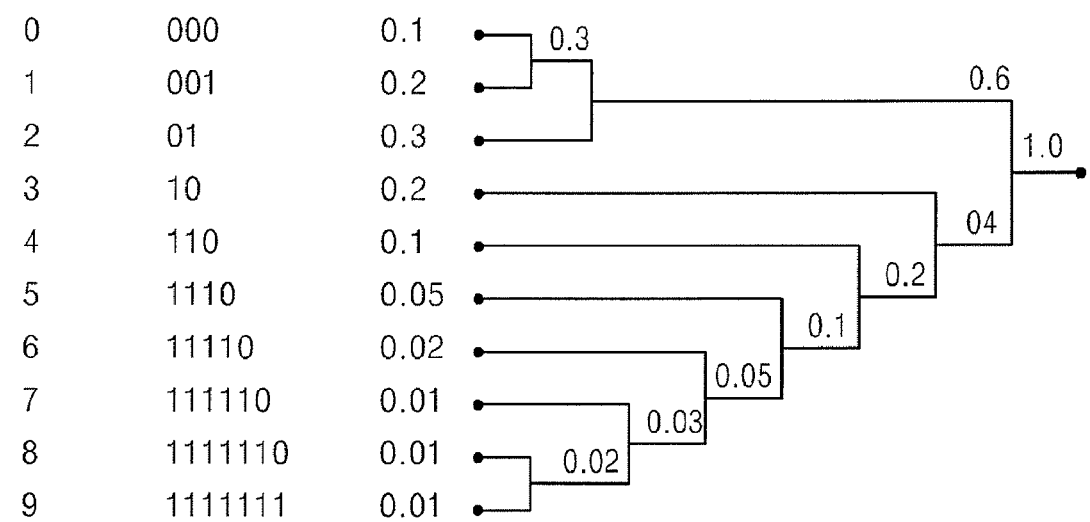
FIG. 2 is a conceptual diagram illustrating a tree structure implemented in a scalable encoding and decoding method and apparatus according to the present general inventive concept.

The tree structure is illustrated in the conceptual diagram of FIG. 2, where a probability that a code '0' is extracted is allocated in an upper direction of each node and a probability that a code '1' is extracted is allocated in a lower direction of each node. Referring to the tree structure illustrated in FIG. 2, if symbols generated by quantization performed in operation 100 are 0, 2, and 5, a codeword '000' is extracted corresponding to the symbol '0', a codeword '01' is extracted corresponding to the symbol '2', and a codeword '1110' is extracted corresponding to the symbol '5', in operation 110.

As a result, the codewords '000', '01', and '1100' corresponding to the symbols 0, 2, and 5 are extracted.

Figure 3:
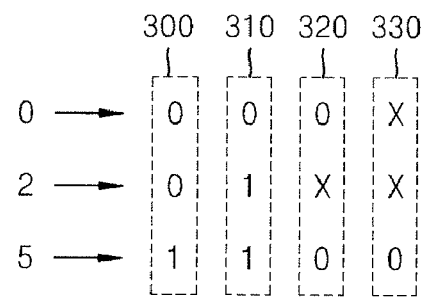
FIG. 3 is a conceptual diagram illustrating a codeword grouping operation performed in the scalable encoding method and apparatus according to the present general inventive concept.
Figure 4:
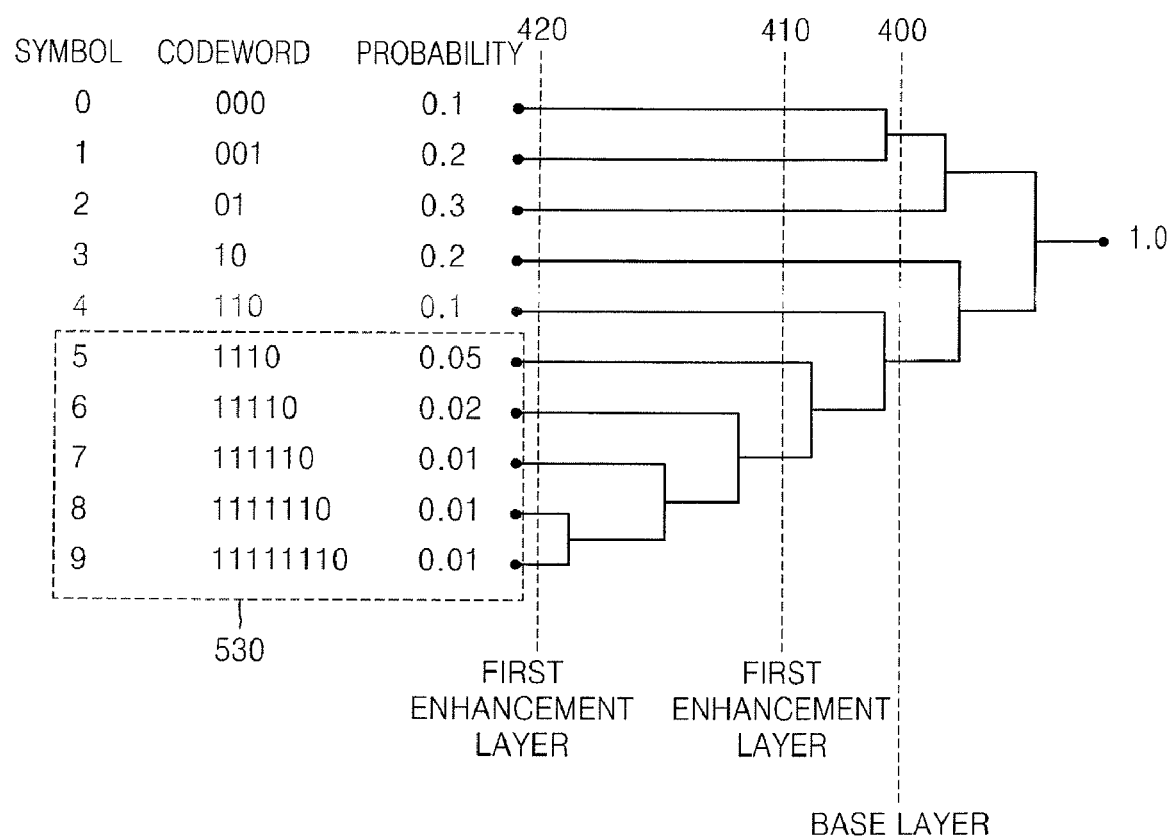
FIG. 4 is a conceptual diagram illustrating a tree structure for encoding different layers into various numbers of bits or performing decoding in a scalable encoding and decoding method and apparatus according to the present general inventive concept.

In operation 120, codes are extracted by dividing the extracted codewords in units of a pre-set length in an order from most significant bits (MSBs) to least significant bits (LSBs), and the extracted codes are grouped into one or more code groups. For example, it is assumed that the codewords '000', '01', and '1100' are extracted in operation 110 and the preset length is one bit. In this case, as illustrated in FIG. 3, a code '0', a code '0', and a code '1' corresponding to the MSBs of the codewords '000', '01', and '1100' are extracted and grouped to form a first group 300 of [0, 0, 1]. A code '0', a code '1', and a code '1' corresponding to second bits of the codewords '000', '01', and '1100' are extracted and grouped to form a second group 310 of [0, 1, 1]. A code '0' and a code '0' corresponding to third bits of the codewords '000' and '1100' are extracted and grouped to form a third group 320 of [0, X, 0]. A code '0' corresponding to a fourth bit of the codeword '1100' is extracted and grouped to form a fourth group 330 of [X, X, 0]. Here, X indicates that codes to be extracted do not exist. Although the preset bit is 1 in the above example, the present general inventive concept is not limited thereto. For example, as illustrated in FIG. 4, 2-bit codes may be extracted and grouped into a first group 400 in operation 120 and encoded as a base layer in operation 130 to be described later, 2-bit codes may be extracted and grouped into a second group 410 in operation 120 and encoded as a first enhancement layer in operation 130, and 3-bit codes may be extracted and grouped into a third group 420 in operation 120 and encoded as a second enhancement layer in operation 130.

In operation 130, the code groups generated in operation 120 are scalably lossless-encoded. In operation 130, a group of codes corresponding to MSBs is set as an uppermost layer and lossless encoded, and a group of codes corresponding to bits lower than the MSBs is set as a layer lower than the uppermost layer and lossless encoded. Referring to FIG. 3, the first group 300 is encoded into a base layer, the second group 310 is encoded into a first enhancement layer, the third group 320 is encoded into a second enhancement layer, and the fourth group 330 is encoded into a third enhancement layer. Thus, a bitstream in which an audio signal is encoded into a plurality of layers is generated.

The lossless encoding performed in operation 130 may be arithmetic encoding. An embodiment in which arithmetic encoding is performed in a scalable encoding method according to the present general inventive concept will now be described with reference to FIGS. 2 and 3, based on the assumption that the symbols generated by quantizing the input signal in operation 100 are 0, 2, and 5. In operation 110, the codewords '000', '01', and '1110' corresponding to the symbols '0', '2', and '5' generated in operation 100 are extracted.

Probabilities $P_{1a}(0)$, $P_{2a}(0)$, and $P_{3a}(0)$ that the codes of the codeword '000' corresponding to the symbol '0' are extracted are calculated as described below by using the tree structure illustrated in FIG. 2. The probability $P_{1a}(0)$ that the first code '0' of the codeword '000' is extracted is determined to be 0.6 according to the tree structure illustrated in FIG. 2.

The probability $P_{2a}(0)$ that the second code '0' of the codeword '000' is extracted is calculated using Equation 3.

$$P_{2a}(0) = \frac{P_1(0)}{P_1(0) + P_1(1)} = \frac{0.3}{0.6} = 0.5 \quad (3)$$

Next, the probability $P_{3a}(0)$ that the third code '0' of the codeword '000' is extracted is calculated using Equation 4.

$$P_{3a}(0) = \frac{P_2(0)}{P_2(0) + P_2(1)} = \frac{0.1}{0.3} = \frac{1}{3} \quad (4)$$

Therefore, the probabilities $P_{1a}(0)$, $P_{2a}(0)$, and $P_{3a}(0)$ that the codes of the codeword '000' are extracted are calculated as 0.6, 0.5, and ⅓. Similarly, the probabilities $P_{1b}(0)$ and $P_{2b}(1)$ that the codes of the codeword '01' corresponding to the symbol '2' are extracted are calculated as 0.6 and 0.5. The probabilities $P_{1c}(1)$, $P_{2c}(1)$, $P_{3c}(1)$, and $P_{4c}(0)$ that the codes of the codeword '1110' corresponding to the symbol '5' are extracted are calculated as 0.4, 0.5, 0.5, and 0.5. In operation 120, the codes [0, 0, 1] corresponding to the MSBs of the codewords '000', '01', and '1100' extracted in operation 110 are grouped into the first group 300, the codes [0, 1, 1] corresponding to the second bits of the codewords '000', '01', and '1100' are grouped into the second group 310, the codes [0, X, 0] corresponding to the third bits of the codewords '000', '01', and '1100' are grouped into the third group 320, and the codes [X, X, 0] corresponding to the fourth bits of the codewords '000', '01', and '1100' are grouped into the fourth group 330.

In operation 130, the base layer is encoded by arithmetic encoding by using the probabilities $P_{1a}(0)$, $P_{1b}(0)$, and $P_{1c}(1)$ (=0.6, 0.6, 0.4) corresponding to the codes of the first group, the first enhancement layer is encoded by arithmetic encoding by using the probabilities $P_{2a}(0)$, $P_{2b}(1)$, and $P_{2c}(1)$ (=0.5, 0.5, 0.5) corresponding to the codes of the second group, the second enhancement layer is encoded by arithmetic encoding by using the probabilities $P_{3a}(0)$, X, and $P_{3c}(0)$ (=⅓, X, 0.5) corresponding to the codes of the third group, and the third enhancement layer is encoded by arithmetic encoding by using the probabilities X, X, and $P_{4c}(0)$ (=X, X, 0.5) corresponding to the codes of the fourth group.

Here, the probability may be a probability of each code of a codeword, a probability of a code of an n-th group or a layer, and a probability of the codeword corresponding to the symbol.

Figure 5:
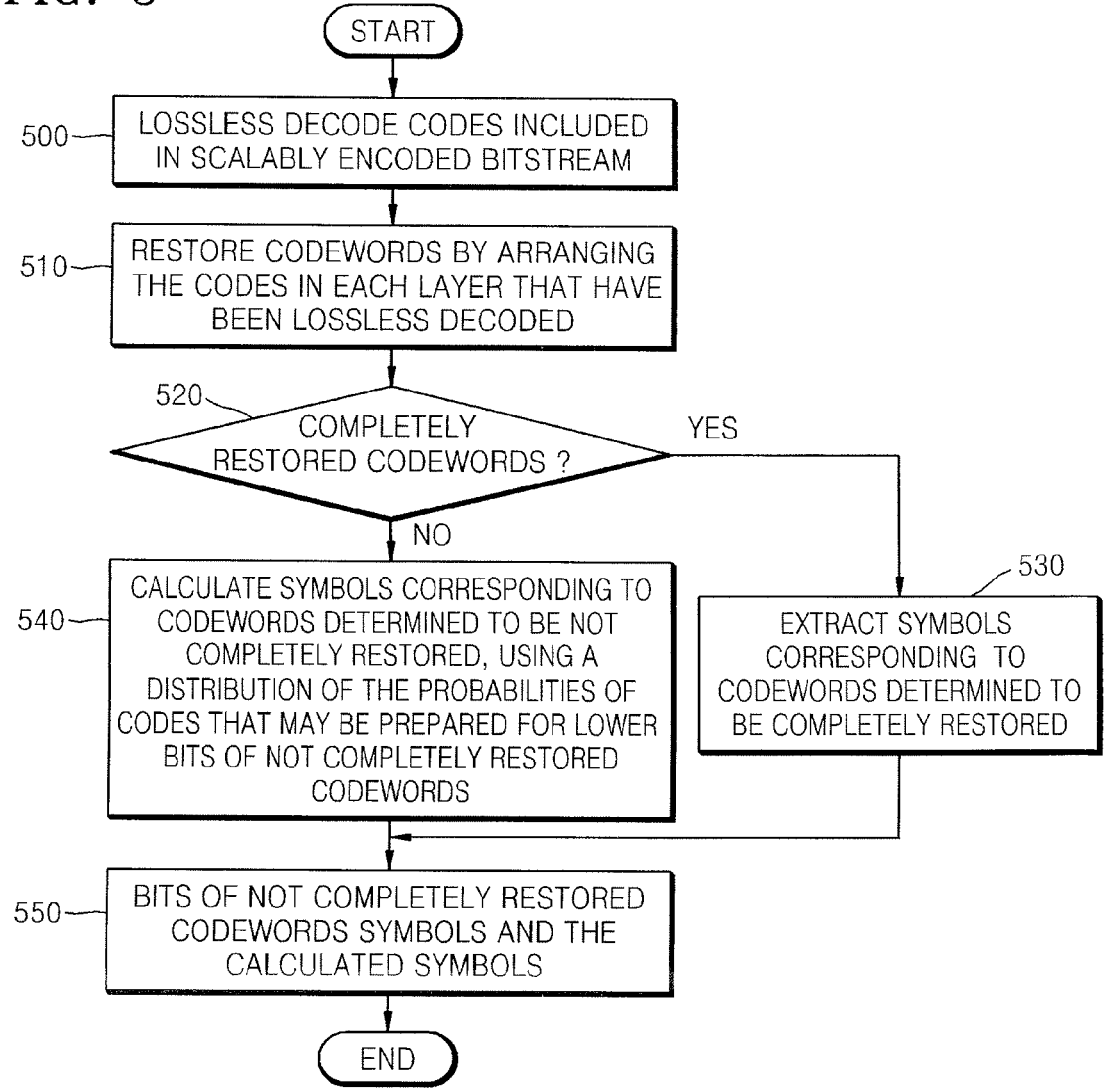
FIG. 5 is a flowchart illustrating a scalable decoding method according to an embodiment of the present general inventive concept.

FIG. 5 is a flowchart illustrating a scalable decoding method according to an embodiment of the present general inventive concept.

Referring to FIG. 5, in operation 500, codes included in a bitstream scalably encoded by an encoder are lossless decoded.

The lossless decoding performed in operation 500 may be arithmetic decoding. In this case, in operation 500, values decimally encoded using a tree structure in which the probability that each code is prepared is allocated to each node are arithmetically decoded into binary codes. The tree structure is illustrated in the conceptual diagram of FIG. 2. In FIG. 2, a probability that a code '0' is extracted is allocated in an upper direction of each node and a probability that a code '1' is extracted is allocated in a lower direction of each node. Data of an input audio signal or an input video signal is decoded according to a probability of a code of each group or each layer (base or enhancement layer).

In operation 510, codewords are restored by arranging the codes in each layer that have been lossless decoded. More specifically, the encoder encodes the codes of a plurality of codewords into a plurality of layers by dividing and grouping the codes of the codewords in units of a predetermined number of bits in the order from MSBs to LSBs. Accordingly, in operation 510, the original codewords are restored by extracting codes corresponding to upper bits from an upper layer and codes corresponding to lower bits from a lower layer and arranging the codes in an order from the upper bits to the lower bits.

In operation 520, codewords not completely restored are detected from the codewords restored in operation 510. The not completely restored codewords are collections of codes that cannot be dequantized due to an omission of the codes corresponding to the lower bits caused by a failure in the reception of bitstreams corresponding to predetermined layers by a decoding end. For example, if a symbol quantized in the encoder is 8, the codeword '1111110' has been encoded by including only the code '1', which is the MSB of the codeword '1111110', in the base layer, by including the codes '11', which are the second and third bits thereof, in the first enhancement layer, and by including the codes '1110', which are the fourth through seventh bits thereof, in the second enhancement layer. However, when the decoding end receives only the base layer and the first enhancement layer, only the codes '111' corresponding to upper bits from among the codes of the codeword '1111110' are decoded. That is, the codes '1110' corresponding to the other bits are not decoded. Consequently, the codeword '1111110' is not completely restored.

In operation 530, symbols corresponding to the codewords determined to be completely restored in operation 510 are extracted. In an embodiment of the present general inventive concept, the symbols corresponding to the completely restored codewords may be extracted from a prestored table formed on the basis of the tree structure illustrated in FIG. 2.

In operation 540, symbols corresponding to the codewords determined to be not completely restored in operation 510 are calculated using a distribution of the probabilities of codes that may be prepared for lower bits of the codewords not completely restored in operation 520. Here, the lower bits of the codewords may correspond to codes of an n-th group compared to codes of an n−1 th group.

In operation 540, an average value of all of the symbols that are restorable by the codes that can be prepared for the lower bits of the not completely restored codewords is calculated using the distribution of the probabilities of the codes that may be prepared for the lower bits of the not completely restored codewords.

$$y_{new} = \frac{\sum_{i \in nodes} y_i p_i}{\sum_{i \in nodes} p_i} \quad (5)$$

where $y_{new}$ denotes the calculated symbols, 'nodes' denote a collection of node numbers that can be prepared for the lower bits of the not completely restored codewords, 'i' denotes a specific node number among the node numbers included in the 'nodes', $y_i$ denotes a symbol of the node i, and $p_i$ denotes the probability of the node i.

For example, if the codes restored in operation 510 are '1110', nodes that can complete codewords by combining lower bits correspond to symbols '5', '6', '7', '8', and '9' encompassed by a dotted box 530 illustrated in FIG. 4. The lower bits may be 0, 1, 10, 110, and 1110 of the codewords of 1110, 11110, 111110, 1111110, and 11111110, respectively.

In operation 540, the symbols '5', '6', '7', '8', and '9' corresponding to the codewords not completely restored in operation 510 may be calculated using Equation 5, as expressed in Equation 6.

$$y_{new} = \frac{\sum_{i \in \{simbol\ 5,6,7,8,9\}} y_i p_i}{\sum_{i \in \{simbol\ 5,6,7,8,9\}} p_i} = \frac{y_5 p_5 + y_6 p_6 + y_7 p_7 + y_8 p_8 + y_9 p_9}{p_5 + p_6 + p_7 + p_8 + p_9} =$$

$$\frac{5*0.05 + 6*0.02 + 7*0.01 + 8*0.01 + 9*0.01}{0.05 + 0.02 + 0.01 + 0.01 + 0.01} = 6.1 \quad (6)$$

As described above, the symbols are restored by calculating expected values for all of the undecodable codewords whose lower bits can be combined. Thus, quantization noise is minimized, and accordingly an optimal signal to noise ratio (SNR) can be obtained.

In operation 550, the original signal is restored by dequantizing the symbols extracted in operation 530 and the symbols calculated in operation 540.

Figure 6:
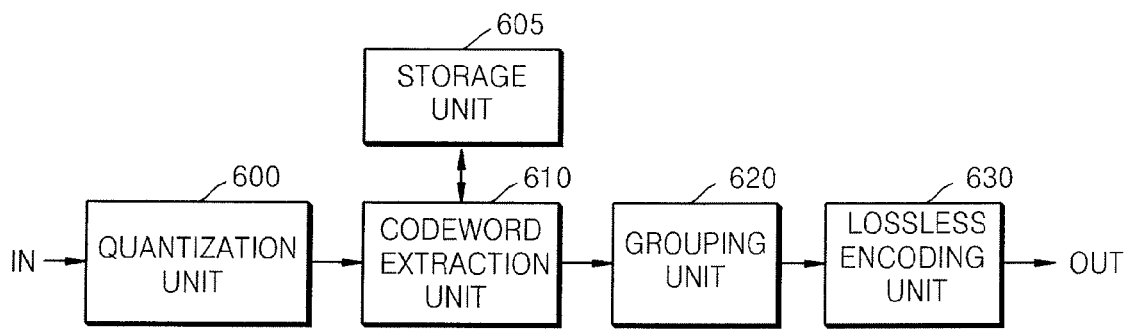
FIG. 6 is a block diagram illustrating a scalable encoding apparatus according to an embodiment of the present general inventive concept.

FIG. 6 is a block diagram illustrating a scalable encoding apparatus according to an embodiment of the present general inventive concept. Referring to FIG. 6, the scalable encoding apparatus includes a quantization unit 600, a storage unit 605, a codeword extraction unit 610, a grouping unit 620, and a lossless encoding unit 630.

The quantization unit 600 quantizes an input signal received via an input port IN so as to generate symbols.

The storage unit 605 stores codewords that are prepared so as to have variable lengths and to correspond to a plurality of prepared symbols. Here, a codeword is a collection of codes that are sequentially arranged. Examples of a code include binary numbers of 0 and 1.

The variable lengths of the codewords previously stored in the storage unit 605 are determined on the basis of the statistical probabilities that symbols are generated. A codeword corresponding to a symbol that is highly likely to be quantized is short, and a codeword corresponding to a symbol that is unlikely to be quantized is long. In other words, a codeword corresponding to a symbol that is statistically frequently quantized can be expressed by using only a small number of bits, whereas a codeword corresponding to a symbol that is statistically rarely quantized should be expressed by using a large number of bits.

In addition, the codewords to be previously stored in the storage unit 605 are formed on the basis of a tree structure in which the probability that each code is prepared is allocated to each node. The probability that each of the codes of a codeword is extracted is calculated using the probability of code extraction allocated to each node in the tree structure, according to Equations 7 and 8.

$$p_i(0) = \frac{p_{i-1}(0)}{p_{i-1}(0) + p_{i-1}(1)} \quad (7)$$

where $P_i(x)$ denotes a probability that x is extracted in an i-th node.

$$p_i(1) = \frac{p_{i-1}(1)}{p_{i-1}(0) + p_{i-1}(1)} \quad (8)$$

where $P_i(x)$ denotes a probability that x is extracted in an i-th node.

The tree structure is illustrated in the conceptual diagram of FIG. 2, where a probability that a code '0' is extracted is allocated in an upper direction of each node and a probability that a code '1' is extracted is allocated in a lower direction of each node.

The codeword extraction unit 610 extracts the codewords corresponding to the symbols generated by the quantization unit 600 from the storage unit 605.

Referring to the tree structure illustrated in FIG. 2, if symbols generated by quantization performed in the quantization unit 600 are 0, 2, and 5, the codeword extraction unit 610 extracts a codeword '000' corresponding to the symbol '0', a codeword '01' corresponding to the symbol '2', and a codeword '1110' corresponding to the symbol '5', thereby extracting the codewords '000', '01', and '1100' corresponding to the symbols 0, 2, and 5.

The grouping unit 620 extracts codes by dividing the extracted codewords in units of a pre-set length in the order from MSBs to LSBs and groups the extracted codes. For example, it is assumed that the codewords '000', '01', and '1100' are extracted by the codeword extraction unit 610 and the preset length is one bit. In this case, as illustrated in FIG. 3, the grouping unit 620 extracts a code '0', a code '0', and a code '1' corresponding to the MSBs of the codewords '000', '01', and '1100' and groups the extracted codes into the first group 300 of [0, 0, 1]. The grouping unit 620 extracts a code '0', a code '1', and a code '1' corresponding to the second bits of the codewords '000', '01', and '1100' and groups the extracted codes into the second group 310 of [0, 1, 1]. The grouping unit 620 extracts a code '0' and a code '0' corresponding to the third bits of the codewords '000' and '1100' and groups the extracted codes into the third group 320 of [0, X, 0]. The grouping unit 620 extracts a code '0' corresponding to the fourth bit of the codeword '1100' and groups the extracted code into the fourth group 330 of [X, X, 0]. Here, X indicates that codes to be extracted do not exist. Although the preset bit is 1 in the above example, the present general inventive concept is not limited thereto. For example, as illustrated in FIG. 4, the grouping unit 620 may extract and group 2-bit codes into the first group 400 and the lossless encoding unit 630 to be described later may encode the first group 400 into a base layer. The grouping unit 620 may extract and group 2-bit codes into the second group 410 and the lossless encoding unit 630 may encode the second group 410 into the first enhancement layer. The grouping unit 620 may extract and group 3-bit codes into the third group 420 and the lossless encoding unit 630 may encode the third group into the second enhancement layer.

The lossless encoding unit 630 scalably lossless encodes code groups generated by the grouping unit 620. The lossless encoding unit 630 sets a group of codes corresponding to MSBs as an uppermost layer and lossless encodes the uppermost layer. The lossless encoding unit 630 sets a group of codes corresponding to bits lower than the MSBs as a layer lower than the uppermost layer and lossless encodes the lower layer. Referring to FIG. 3, the lossless encoding unit 630 encodes the first group 300 into the base layer, the second group 310 into the first enhancement layer, the third group 320 into the second enhancement layer, and the fourth group 330 into the third enhancement layer. Thus, the lossless encoding unit 630 generates a bitstream in which an audio signal is encoded into a plurality of layers, and outputs the bitstream via an output port OUT.

The lossless encoding performed in the lossless encoding unit 630 may be arithmetic encoding. An embodiment in which arithmetic encoding is performed in a scalable encoding apparatus according to the present general inventive concept will now be described with reference to FIGS. 2 and 3, based on the assumption that the symbols generated by quantizing the input signal in the quantization unit 600 are 0, 2, and 5. The codeword extraction unit 610 extracts the codewords '000', '01', and '1110' corresponding to the symbols '0', '2', and '5' generated in the quantization unit 600 from the storage unit 605.

Probabilities $P_{1a}(0)$, $P_{2a}(0)$, and $P_{3a}(0)$ that the codes of the codeword '000' corresponding to the symbol '0' are extracted are calculated as described below by using the tree structure illustrated in FIG. 2. The probability $P_{1a}(0)$ that the first code '0' of the codeword '000' is extracted is determined to be 0.6 according to the tree structure illustrated in FIG. 2. The probability $P_{2a}(0)$ that the second code '0' of the codeword '000' is extracted is calculated using Equation 9.

$$P_{2a}(0) = \frac{P_1(0)}{P_1(0) + P_1(1)} = \frac{0.3}{0.6} = 0.5 \qquad (9)$$

Next, the probability $P_{3a}(0)$ that the third code '0' of the codeword '000' is extracted is calculated using Equation 10.

$$P_{3a}(0) = \frac{P_2(0)}{P_2(0) + P_2(1)} = \frac{0.1}{0.3} = \frac{1}{3} \qquad (10)$$

Therefore, the probabilities $P_{1a}(0)$, $P_{2a}(0)$, and $P_{3a}(0)$ that the codes of the codeword '000' are extracted are calculated as 0.6, 0.5, and ⅓. Similarly, the probabilities $P_{1b}(0)$ and $P_{2b}(1)$ that the codes of the codeword '01' corresponding to the symbol '2' are extracted are calculated as 0.6 and 0.5. The probabilities $P_{1c}(1)$, $P_{2c}(1)$, $P_{3c}(1)$, and $P_{4c}(0)$ that the codes of the codeword '1110' corresponding to the symbol '5' are extracted are calculated as 0.4, 0.5, 0.5, and 0.5. The grouping unit 620 groups the codes [0, 0, 1] corresponding to the MSBs of the codewords '000', '01', and '1100' extracted by the codeword extraction unit 610 into the first group 300, the codes [0, 1, 1] corresponding to the second bits of the codewords '000', '01', and '1100' into the second group 310, the codes [0, X, 0] corresponding to the third bits of the codewords '000', '01', and '1100' into the third group 320, and the codes [X, X, 0] corresponding to the fourth bits of the codewords '000', '01', and '1100' into the fourth group 330.

The lossless encoding unit 630 encodes the base layer by performing arithmetic encoding using the probabilities $P_{1a}(0)$, $P_{1b}(0)$, and $P_{1c}(1)$ (=0.6, 0.6, 0.4) corresponding to the codes of the first group, encodes the first enhancement by performing arithmetic encoding using the probabilities $P_{2a}(0)$, $P_{2b}(1)$, and $P_{2c}(1)$ (=0.5, 0.5, 0.5) corresponding to the codes of the second group, encodes the second enhancement layer by performing arithmetic encoding using the probabilities $P_{3a}(0)$, X, and $P_{3c}(0)$ (=⅓, X, 0.5) corresponding to the codes of the third group, and encodes the third enhancement layer by performing arithmetic encoding using the probabilities X, X, and $P_{4c}(0)$ (=X, X, 0.5) corresponding to the codes of the fourth group.

Figure 7:
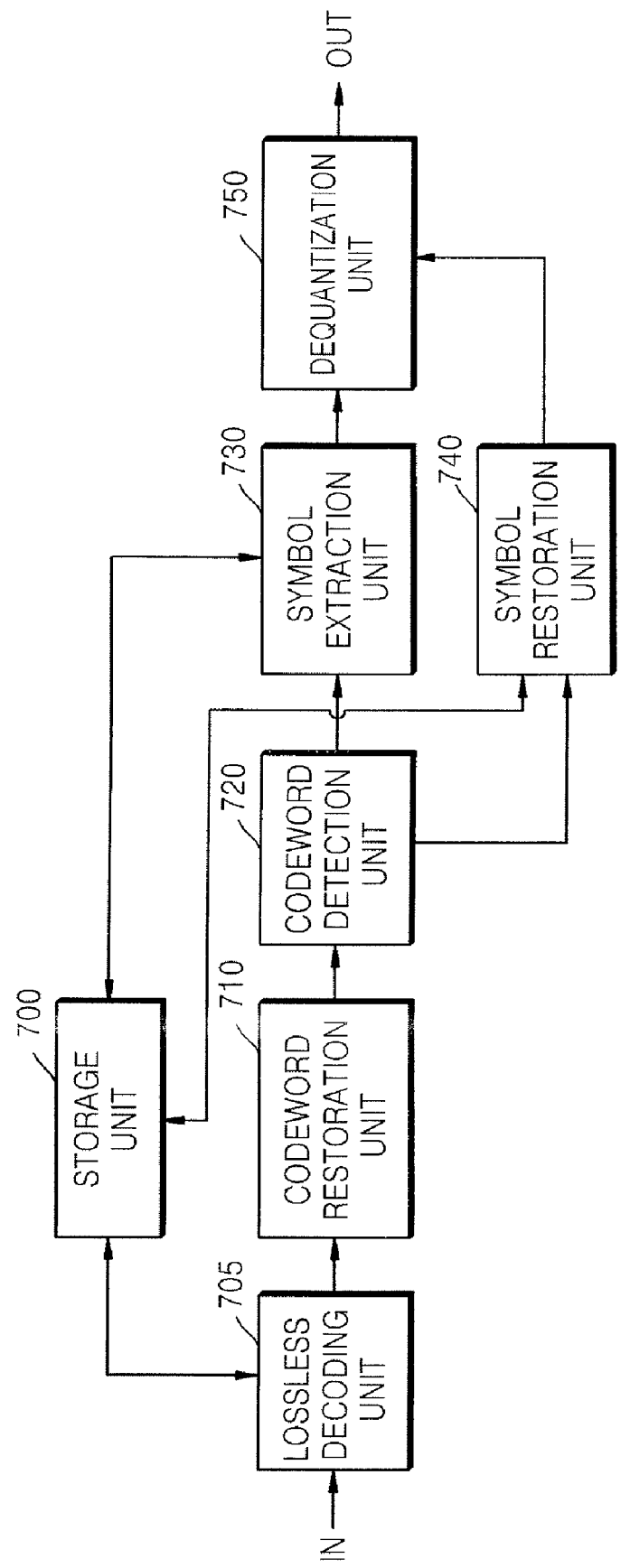
FIG. 7 is a block diagram illustrating a scalable decoding apparatus according to an embodiment of the present general inventive concept.

FIG. 7 is a block diagram of a scalable decoding apparatus according to an embodiment of the present general inventive concept. Referring to FIG. 7, the scalable decoding apparatus includes a storage unit 700, a lossless decoding unit 705, a codeword restoration unit 710, a codeword detection unit 720, a symbol extraction unit 730, a symbol restoration unit 740, and a dequantization unit 750.

The storage unit 700 stores symbols corresponding to codewords prepared so as to have variable lengths. The variable lengths of the codewords previously stored in the storage unit 700 are determined on the basis of the statistical probabilities that symbols are generated. A codeword corresponding to a symbol that is highly likely to be quantized is short, and a codeword corresponding to a symbol that is unlikely to be quantized is long. In other words, a codeword corresponding to a symbol that is statistically frequently quantized can be expressed by using only a small number of bits, whereas a codeword corresponding to a symbol that is statistically rarely quantized should be expressed by using a large number of bits.

In addition, the codewords to be previously stored in the storage unit 700 are formed on the basis of a tree structure in which the probability that each code is prepared is allocated to each node. The tree structure is illustrated in the conceptual diagram of FIG. 2, where a probability that a code '0' is extracted is allocated to each node located on the upper side and a probability that a code '1' is extracted is allocated to each node located on the lower side.

The lossless decoding unit 705 receives a bitstream scalably encoded by an encoder via an input port IN and lossless decodes codes in each layer included in the bitstream.

The lossless decoding performed in the lossless decoding unit 705 may be arithmetic decoding. In this case, the lossless decoding unit 705 may arithmetically decode into binary codes values that have been stored in the storage unit 700 and decimally encoded using a tree structure in which the probability that each code is prepared is allocated to each node.

The codeword restoration unit 710 restores codewords by arranging the codes in each layer that have been lossless decoded by the lossless decoding unit 705. More specifically, the encoder encodes the codes of a plurality of codewords into a plurality of layers by dividing and grouping the codes of the codewords in units of a predetermined number of bits in the order from MSBs to LSBs. Accordingly, the codeword restoration unit 710 restores the original codewords by extracting codes corresponding to upper bits from an upper layer and codes corresponding to lower bits from a lower layer and arranging the codes in the order from the upper bits to the lower bits.

The codeword detection unit 720 detects not completely restored codewords from the codewords restored by the codeword restoration unit 710. The not completely restored codewords are collections of codes that cannot be dequantized due to an omission of the codes corresponding to the lower bits caused by a failure in the reception of bitstreams corresponding to predetermined layers by a decoding end. For example, if a symbol quantized in the encoder is 8, the codeword '1111110' has been encoded by including only the code '1', which is the MSB of the codeword '1111110', in the base layer, by including the codes '11', which are the second and third bits thereof, in the first enhancement layer, and by including the codes '1110', which are the fourth through seventh bits thereof, in the second enhancement layer. However, when the decoding end receives only the base layer and the first enhancement layer, only the codes '111' corresponding to upper bits from among the codes of the codeword '1111110' are decoded. That is, the codes '1110' corresponding to the other bits are not decoded. Consequently, the codeword '1111110' is not completely restored.

In an embodiment of the present general inventive concept, a determination of completely restored codewords or incompletely restored codewords performed by the codeword detection unit 720 may be based on whether the codewords restored by the codeword restoration unit 710 are consistent with the codewords stored in the storage unit 700.

The symbol extraction unit 730 extracts symbols corresponding to codewords determined to be completely restored codewords by the codeword detection unit 720 from the storage unit 700.

The symbol restoration unit 740 calculates symbols corresponding to codewords determined to be not completely restored codewords by the codeword detection unit 720 by using a distribution of the probabilities of codes that may be prepared for lower bits of the codewords determined to be the not completely restored codewords. The symbol restoration unit 740 calculates an average value of all of the symbols that are restorable by the codes that can be prepared for the lower bits of the not completely restored codewords, by using the distribution of the probabilities of the codes that may be prepared for the lower bits of the not completely restored codewords.

$$y_{new} = \frac{\sum_{i \in nodes} y_i p_i}{\sum_{i \in nodes} p_i} \quad (11)$$

where $y_{new}$ denotes the calculated symbols, 'nodes' denote a collection of node numbers that can be prepared for the lower bits of the not completely restored codewords, 'i' denotes a specific node number among the node numbers included in the 'nodes', $y_i$ denotes a symbol of the node i, and $p_i$ denotes the probability of the node i.

For example, if the codes restored by the code restoration unit 710 are '1110', nodes that can complete codewords by combining lower bits correspond to the symbols '5', '6', '7', '8', and '9' encompassed by the dotted box 530 illustrated in FIG. 4. The symbol restoration unit 740 may calculate the symbols '5', '6', '7', '8', and '9' corresponding to the not completely restored codewords by using Equation 12, as expressed in Equation 13.

$$y_{new} = \frac{\sum_{i \in \{simbol\ 5,6,7,8,9\}} y_i p_i}{\sum_{i \in \{simbol\ 5,6,7,8,9\}} p_i} = \frac{y_5 p_5 + y_6 p_6 + y_7 p_7 + y_8 p_8 + y_9 p_9}{p_5 + p_6 + p_7 + p_8 + p_9} = \frac{5*0.05 + 6*0.02 + 7*0.01 + 8*0.01 + 9*0.01}{0.05 + 0.02 + 0.01 + 0.01 + 0.01} = 6.1 \quad (13)$$

As described above, the symbols are restored by calculating expected values for all of the undecodable codewords whose lower bits can be combined. Thus, quantization noise is minimized, and accordingly an optimal SNR can be obtained.

The dequantization unit 750 restores the original signal by dequantizing the symbols extracted by the symbol extraction unit 730 and the symbols calculated by the symbol restoration unit 740, and outputs the restored signal via an output port OUT.

Figure 8:
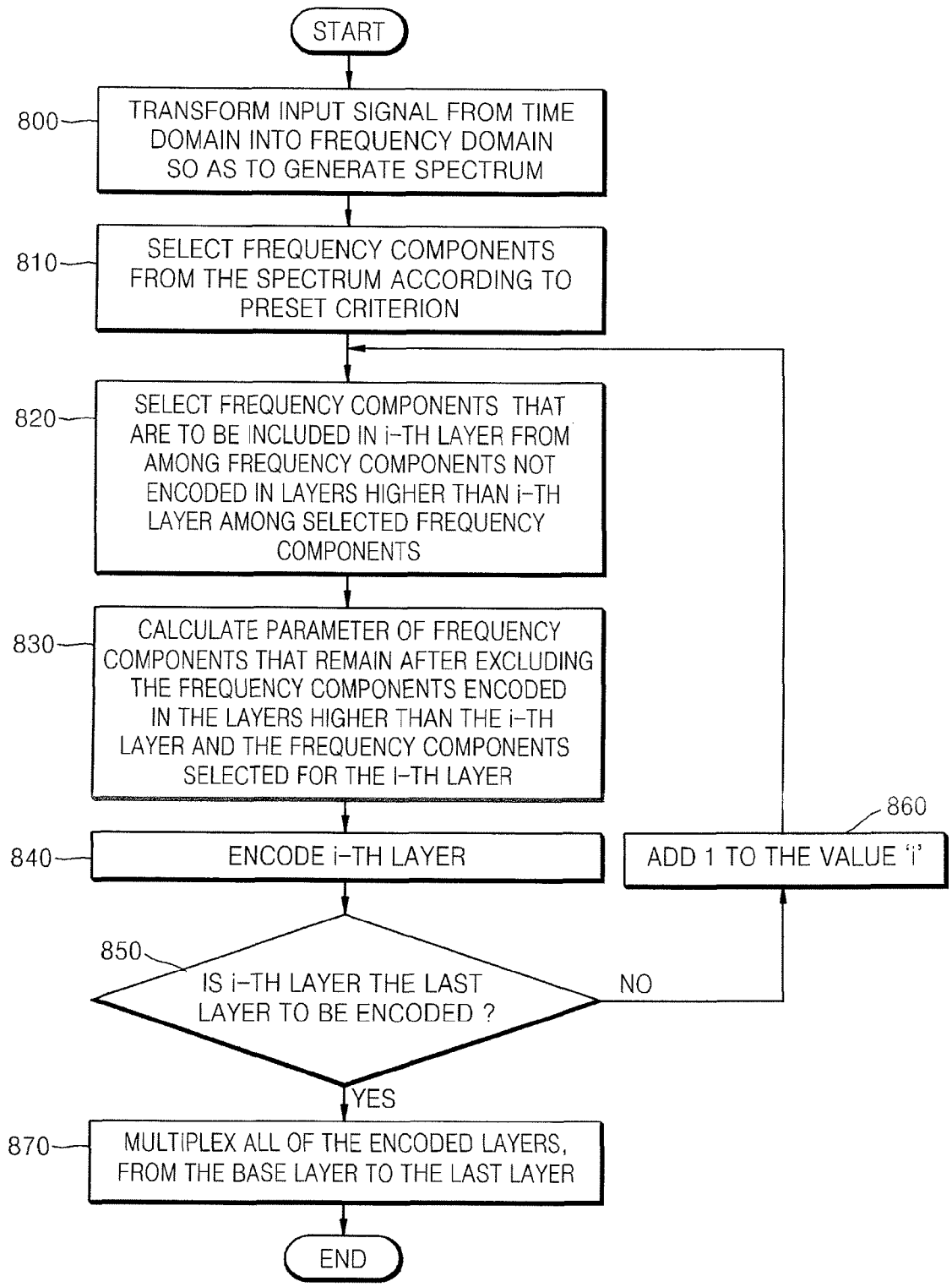
FIG. 8 is a flowchart illustrating a scalable encoding method according to another embodiment of the present general inventive concept.

FIG. 8 is a flowchart of a scalable encoding method according to another embodiment of the present general inventive concept.

First, in operation 800, an input signal in a time domain is transformed into a frequency domain so as to generate a spectrum.

In operation 810, frequency components are selected from the spectrum generated in operation 800 according to a preset criterion. The preset criterion denotes an important factor for human perception that has been preset according to experience or experimentation. In an embodiment of the present general inventive concept, frequency components corresponding to a signal having a signal-to-mask ratio (SMR) greater than a masking threshold may be selected. In another embodiment, frequency components may be selected by extracting a spectrum peak in consideration of a predetermined weight value. In still another embodiment, frequency components having peak values equal to or greater than a predetermined value are selected from subbands having low SNR values. Each of the aforementioned three embodiments may be performed, but a combination of at least two of the embodiments may also be performed.

In operation 820, frequency components that are to be included in an i-th layer and the number of which corresponds to a bitrate allocated to the i-th layer are selected from frequency components not encoded in layers higher than the i-th layer among the selected frequency components.

Here, the value 'i' is set as an initial value of 1. Accordingly, in operation 820, the most perceptually important frequency components to be included in a base layer corresponding to a first layer are first selected. When 2 is allocated as the value 'i' after performing operations 830 through 860, frequency components to be included in a first enhancement layer corresponding to a second layer are selected from frequency components other than the frequency components selected for the base layer. For example, referring to FIG. 10, frequency components SC0, SC1, SC2, and SC3 are selected as illustrated in a block 1000, in operation 810. '0' illustrated in the block 1000 denotes locations of frequency components not selected in operation 810.

In operation 820, first, as illustrated in a block 1010, the frequency component SC0 is selected as the most perceptually important frequency component to be included in the base layer corresponding to the first layer. Next, as illustrated in a block 1020, the frequency component SC1 is selected as the most perceptually important frequency component to be included in the first enhancement layer corresponding to the second layer, from among frequency components that remain after the selection of the frequency component SC0 from the frequency components SC0, SC1, SC2, and SC3. Then, as illustrated in a block 1030, the frequency component SC2 is selected as the most perceptually important frequency component to be included in the second enhancement layer corresponding to the third layer, from among frequency components that remain after the selection of the frequency components SC0 and SC1 from the frequency components SC0, SC1, SC2, and SC3. Lastly, the frequency component SC3 is selected as the most perceptually important frequency component to be included in the third enhancement layer corresponding to the fourth layer. Consequently, in operation 820, all of the frequency components SC0, SC1, SC2, and SC3 selected in operation 810 are selected to be included in the first through fourth layers as illustrated in a block 1040.

When a frequency component to be included in the i-th layer is selected in operation 820, frequency components perceptually important in terms of human hearing are selected to be included in upper layers, whereas frequency components perceptually not important in terms of human hearing are selected to be included in lower layers. A criterion used in operation 820 may be similar to the preset criterion used in operation 810 except that the value of a threshold corresponding to the preset criterion varies according to layers. For example, a threshold corresponding to the preset criterion for an upper layer is set to be high, whereas a threshold corresponding to the preset criterion for a lower layer is set to be low. Operation 820 is not limited to the aforementioned embodiments of operation 810 but may use different criteria depending on a perceptual importance in terms of human hearing for each layer.

Figure 11A:
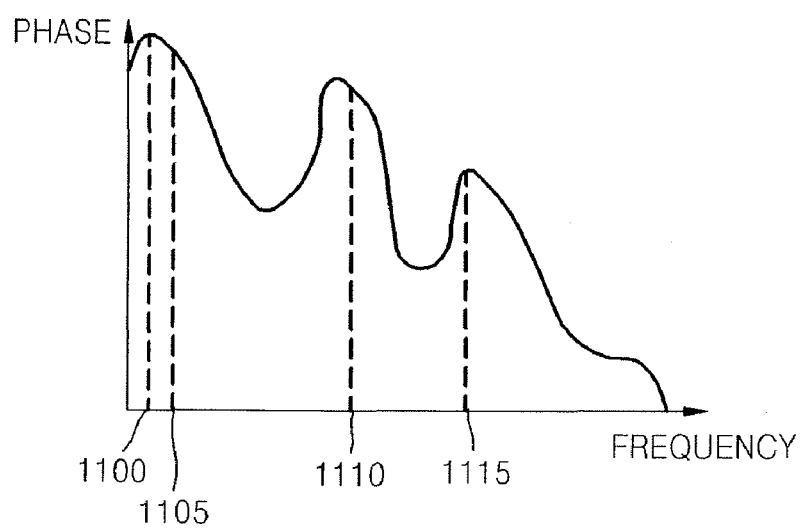
FIGS. 11A through 11C are graphs illustrating an embodiment in which frequency components are selected in an order from an upper layer to a lower layer according to a perceptual importance in terms of human hearing in order to be encoded or decoded.
Figure 11B:
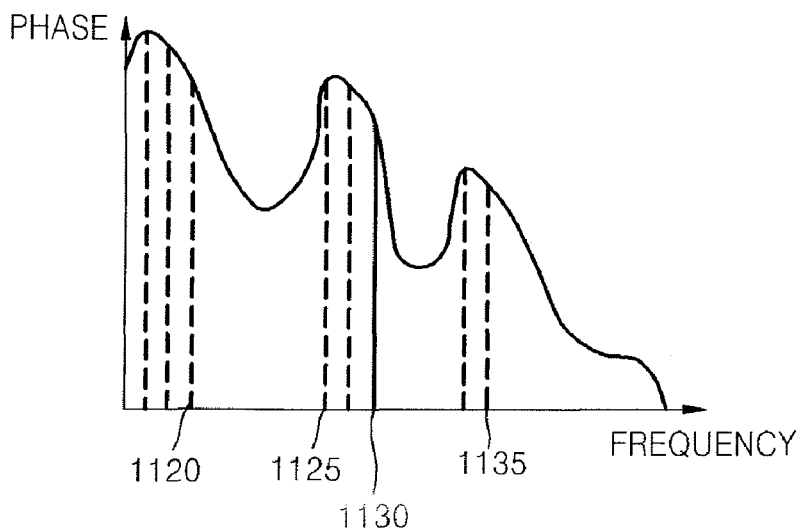
Figure 11C:
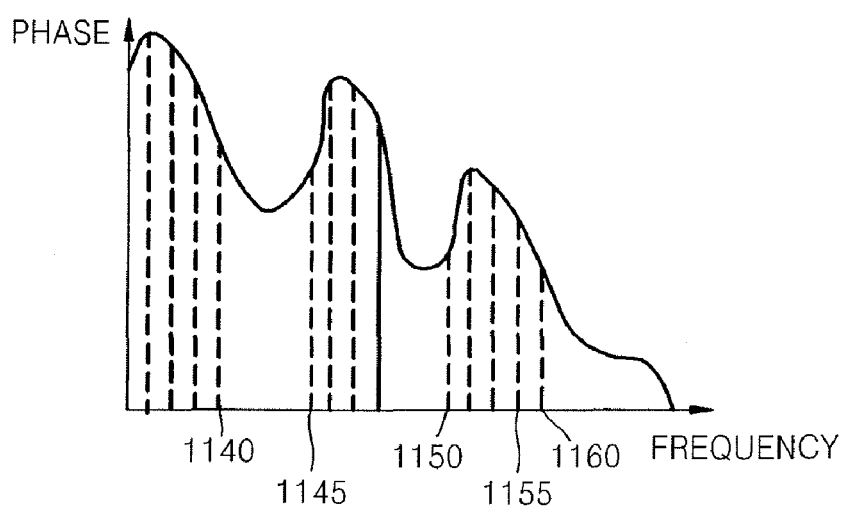

FIGS. 11A through 11C are graphs illustrating an embodiment of operation 820 in which frequency components are selected in the order from an upper layer to a lower layer according to the perceptual importance in terms of human hearing. First, as illustrated in FIG. 11A, frequency components located at positions 1100, 1105, 1110, and 1115 are selected as the most perceptually important frequency components to be included in the base layer corresponding to the first layer. Next, as illustrated in FIG. 11B, frequency components located at positions 1120, 1125, 1130, and 1135 are selected as the most perceptually important frequency components to be included in the first enhancement layer corresponding to the second layer from among frequency components that remain after the frequency components included in the base layer, and all of the frequency components selected for the base layer and the first enhancement layer are encoded. Lastly, as illustrated in FIG. 11C, frequency components located at positions 1140, 1145, 1150, and 1155 are selected as the most perceptually important frequency components to be included in the second enhancement layer corresponding to the third layer, and all of the frequency components selected for the base layer and the first and second enhancement layers are encoded.

Figure 12A:
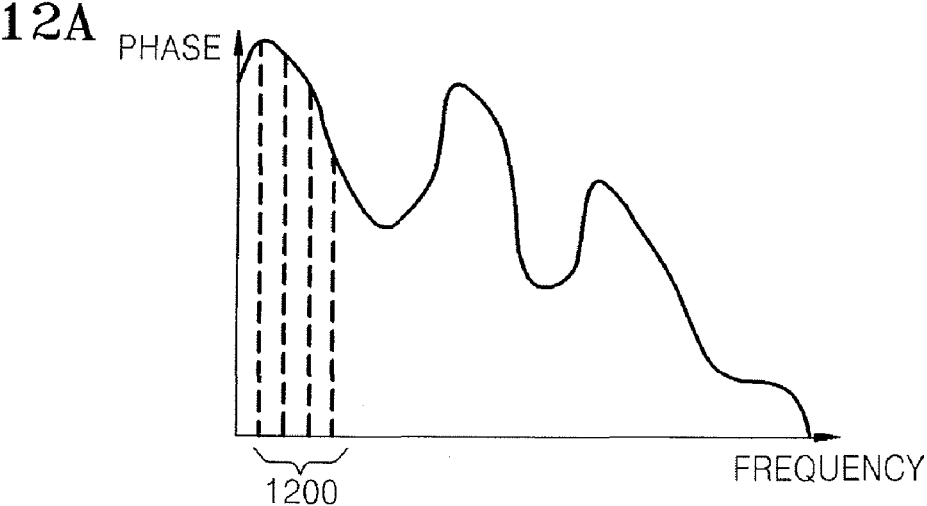
FIGS. 12A through 12C are graphs illustrating an embodiment in which frequency components for each layer are selected based on a frequency, that is, in the order from a low frequency to a high frequency, in order to be encoded or decoded.
Figure 12B:
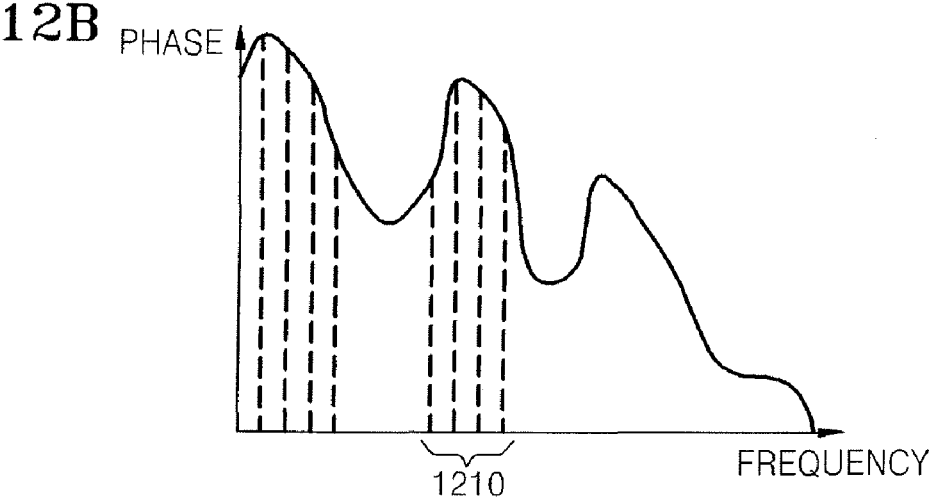
Figure 12C:
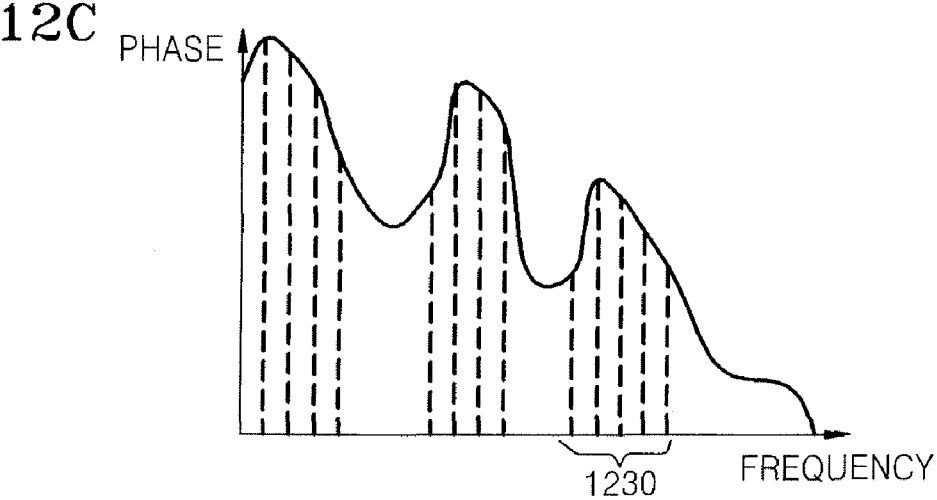

Alternatively, referring back to FIG. 8, in operation 820, the frequency components selected in operation 810 may be selected based on a frequency, that is, in an order from a low frequency to a high frequency, so as to be included in each layer. This selection is illustrated in FIGS. 12A through 12C. Referring to FIG. 12A, frequency components located as a position 1200, corresponding to frequency components provided to a low frequency band which is important in terms of human hearing, are selected to be included in the base layer corresponding to the first layer. Referring to FIG. 12B, frequency components located at a position 1210, corresponding to frequency components provided to a band next to the low frequency band, are selected to be included in the first enhancement layer corresponding to the second layer. Referring to FIG. 12C, frequency components located at a position 1220 (labeled 1230 in FIG. 12C), corresponding to frequency components provided to a high frequency band, are selected to be included in the second enhancement layer corresponding to the third layer.

Referring back to FIG. 8, in operation 830, a parameter of frequency components that remain after excluding the frequency components encoded in the layers higher than the i-th layer and the frequency components selected for the i-th layer in operation 820 is calculated. Examples of the parameter include the energy value of the remaining frequency components included in each subband, parameters indicating the noise level and envelope of each subband, and so on. For example, in operation 830, an energy value for each subband of the frequency components that remain after excluding the frequency components encoded in the layers higher than the i-th layer and the frequency components selected for the i-th layer in operation 820 is calculated.

In operation 840, the frequency components selected for the i-th layer in operation 820 and information about the locations of the frequency components are encoded into the i-th layer, and the parameter calculated in operation 830 is parametrically encoded into the i-th layer.

In operation 850, it is determined whether the i-th layer is the last layer to be encoded.

In operation 860, when it is determined in operation 850 that the i-th layer is not the last layer, 1 is added to the value 'i'. The operations 820 through 850 are repeated for an (i+1)th layer.

In operation 870, when it is determined in operation 850 that there are no layers to be encoded, all of the encoded layers, from the base layer to the last layer, which are encoded in operation 840, are scalably multiplexed to generate a bitstream.

Figure 9:
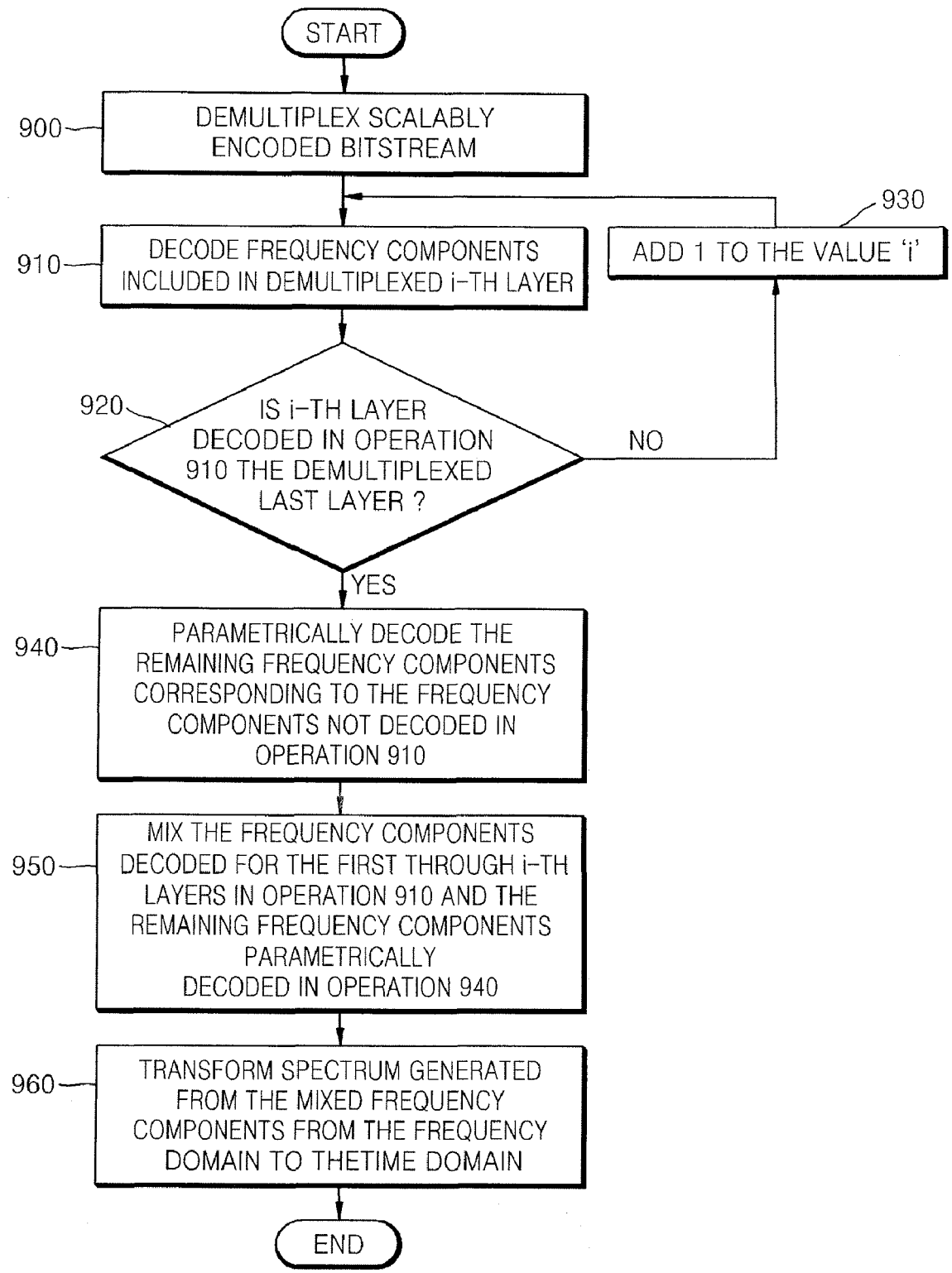
FIG. 9 is a flowchart illustrating a scalable decoding method according to another embodiment of the present general inventive concept.

FIG. 9 is a flowchart of a scalable decoding method according to another embodiment of the present general inventive concept.

First, in operation 900, a bitstream scalably encoded by an encoder is demultiplexed.

In operation 910, frequency components included in a demultiplexed i-th layer are decoded. Here, the value 'i' is set as an initial value of 1. Accordingly, in operation 910, the most perceptually important frequency components included in a base layer corresponding to a first layer are first decoded. If a decoding end receives a first enhancement layer corresponding to a second layer, frequency components that are included in the first enhancement layer and are of secondary importance to the frequency components included in the base layer are decoded.

Figure 10:
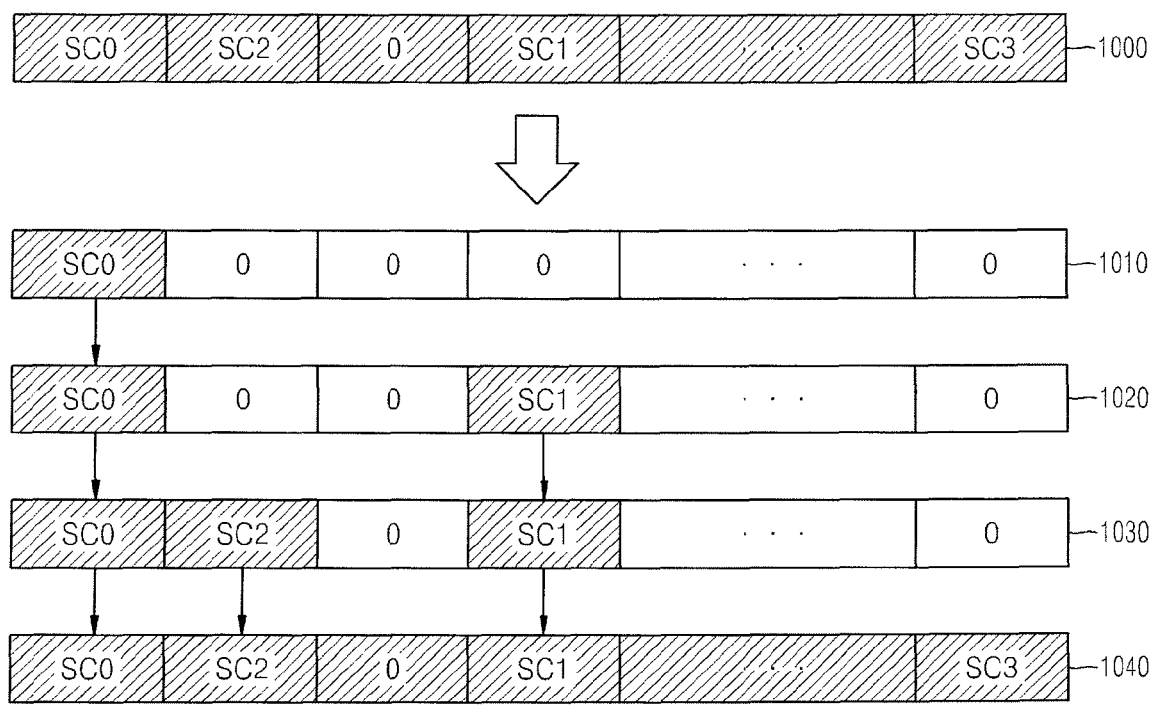
FIG. 10 is a conceptual diagram illustrating locations of frequency components selected for each layer in a scalable encoding method and apparatus according to the present general inventive concept and locations of frequency components decoded for each layer in a scalable decoding method and apparatus according to the present general inventive concept.

For example, referring to FIG. 10, when only the basic layer corresponding to the first layer is decoded in operation 910, only the frequency component SC0 provided at a location illustrated in the block 1010 is decoded. '0' illustrated in FIG. 10 denotes locations of frequency components not decoded by a decoder. When the basic layer and the first enhancement layer corresponding to the second layer are decoded in operation 910, the frequency components SC0 and SC1 provided at locations illustrated in the block 1020 are decoded. When the basic layer, the first enhancement layer, and the second enhancement layer corresponding to the third layer are decoded in operation 910, the frequency components SC0, SC1, and SC2 provided at locations illustrated in the block 1030 are decoded. When the basic layer, the first and second enhancement layers, and the last layer corresponding to the fourth layer are decoded in operation 910, all of the frequency components SC0, SC1, SC2, and SC3 selected and encoded by the encoder, as in locations illustrated in the block 1040, are decoded.

If the encoder selects and encodes frequency components for each layer in the order from an upper layer to a lower layer according to perceptual importance, decoding is performed in operation 910 as illustrated in FIGS. 11A through 11C. First, when only the basic layer corresponding to the first layer is decoded in operation 910, the frequency components provided at the locations 1100, 1105, 1110, and 1115 are decoded as illustrated in FIG. 11A. Next, when the basic layer and the first enhancement layer corresponding to the second layer are decoded in operation 910, the frequency components provided at the locations 1100, 1105, 1110, 1115, 1120, 1125, 1130, and 1135 are decoded as illustrated in FIG. 11B. Lastly, when the basic layer, the first enhancement layer, and the second enhancement layer corresponding to the third layer are decoded in operation 910, the frequency components provided at the locations 1100, 1105, 1110, 1115, 1120, 1125, 1130, 1135, 1140, 1145, 1150, and 1155 are decoded as illustrated in FIG. 11C.

If the encoder selects and encodes frequency components for each layer on the basis of a frequency, that is, in the order from a low frequency to a high frequency, decoding is performed in operation 910 as illustrated in FIGS. 12A through 12C. First, when only the basic layer corresponding to the first layer is decoded in operation 910, the frequency components in a low frequency band provided at the location 1200 are decoded as illustrated in FIG. 12A. Next, when the basic layer and the first enhancement layer corresponding to the second layer are decoded in operation 910, the frequency components in a band next to the low frequency band provided at the locations 1200 and 1210 are decoded as illustrated in FIG. 12B. Lastly, when the basic layer, the first enhancement layer, and the second enhancement layer corresponding to the third layer are decoded in operation 910, the frequency components including from the low frequency bands to high frequency bands, corresponding to frequency components encoded at the locations 1200, 1210, and 1220 (labeled 1230 in FIG. 12C) by the encoder, are decoded as illustrated in FIG. 12C.

In operation 920, it is determined whether an i-th layer decoded in operation 910 is the last layer demultiplexed in operation 900.

In operation 930, when it is determined in operation 920 that the i-th layer is not the last layer, 1 is added to the value 'i'. Operations 910 and 920 are repeated for an (i+1)th layer.

In operation 940, the remaining frequency components corresponding to the frequency components not decoded in operation 910 are parametrically decoded. Examples of a parameter decoded in operation 940 include the energy value of the remaining frequency components included in each subband, parameters indicating the noise level and envelope of each subband, and so on. For example, in operation 940, an energy value for each subband of the frequency components that remain after excluding the frequency components decoded for the first through i-th layers in operation 910 is decoded.

In operation 950, the frequency components decoded for the first through i-th layers in operation 910 and the remaining frequency components parametrically decoded in operation 940 are mixed together.

In operation 960, a spectrum generated from the frequency components mixed in operation 950 is transformed from the frequency domain to the time domain, thereby restoring the original signal.

Figure 13:
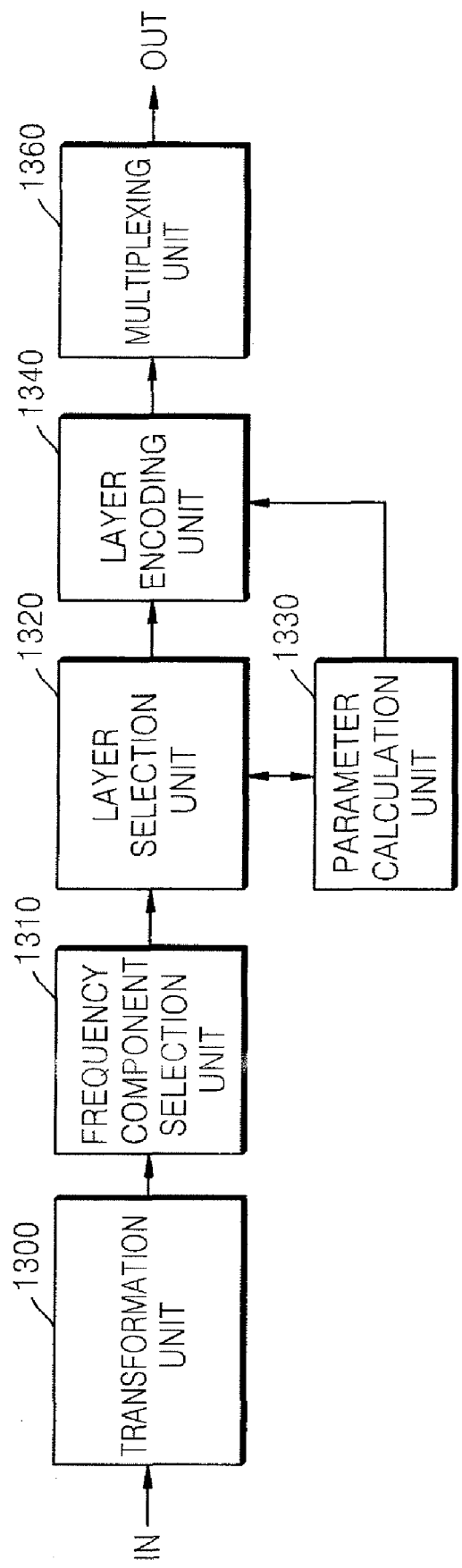
FIG. 13 is a block diagram illustrating a scalable encoding apparatus according to another embodiment of the present general inventive concept.

FIG. 13 is a block diagram of a scalable encoding apparatus according to another embodiment of the present general inventive concept. Referring to FIG. 13, the scalable encoding apparatus includes a transformation unit 1300, a frequency component selection unit 1310, a layer selection unit 1320, a parameter calculation unit 1330, a layer encoding unit 1340, and a multiplexing unit 1360.

The transformation unit 1300 receives an input signal via an input port IN and transforms the input signal from the time domain to the frequency domain so as to generate a spectrum.

The frequency component selection unit 1310 selects frequency components from the spectrum generated by the transformation unit 1300 according to a preset criterion. The preset criterion denotes an important factor for human perception that has been preset according to experience or experimentation. In an embodiment of the present general inventive concept, frequency components corresponding to a signal having an SMR greater than a masking threshold may be selected. In another embodiment, frequency components may be selected by extracting a spectrum peak in consideration of a predetermined weight value. In still another embodiment, frequency components having peak values equal to or greater than a predetermined value are selected from subbands having low SNR values. Each of the aforementioned three embodiments may be performed, but a combination of at least two of the embodiments may also be performed.

The layer selection unit 1320 selects frequency components that are to be included in an i-th layer and the number of which corresponds to a bitrate allocated to the i-th layer from among frequency components not encoded in layers higher than the i-th layer among the selected frequency components.

Here, the value 'I' is set as an initial value of 1. Accordingly, the layer selection unit 1320 first selects the most perceptually important frequency components to be included in a base layer corresponding to a first layer. When 2 is allocated as the value 'i', the layer selection unit 1320 selects frequency components to be included in a first enhancement layer corresponding to a second layer from among frequency components other than the frequency components selected for the base layer from among the frequency components selected by the frequency component selection unit 1310. For example, referring to FIG. 10, the frequency component selection unit 1310 selects frequency components SC0, SC1, SC2, and SC3 as illustrated in the block 1000. '0' illustrated in the block 1000 denotes locations of frequency components not selected by the frequency component selection unit 1310.

First, as illustrated in a block 1010, the layer selection unit 1320 selects the frequency component SC0 as the most perceptually important frequency component to be included in the base layer corresponding to the first layer. Next, as illustrated in a block 1020, the layer selection unit 1320 selects the frequency component SC1 as the most perceptually important frequency component to be included in the first enhancement layer corresponding to the second layer, from among frequency components that remain after the selection of the frequency component SC0 from the frequency components SC0, SC1, SC2, and SC3 selected by the frequency component selection unit 1310. Then, as illustrated in a block 1030, the layer selection unit 1320 selects the frequency component SC2 as the most perceptually important frequency component to be included in the second enhancement layer corresponding to the third layer, from among frequency components that remain after the selection of the frequency components SC0 and SC1 from the frequency components SC0, SC1, SC2, and SC3 selected by the frequency component selection unit 1310. Lastly, the layer selection unit 1320 selects the frequency component SC3 as the most perceptually important frequency component to be included in the third enhancement layer corresponding to the fourth layer. Consequently, as illustrated in a block 1040, the layer selection unit 1320 selects all of the frequency components SC0, SC1, SC2, and SC3 selected by the frequency component selection unit 1310 so as to be included in the first through fourth layers.

When the layer selection unit 1320 selects a frequency component to be included in the i-th layer, frequency components perceptually important in terms of human hearing are selected to be included in upper layers, whereas frequency components perceptually not important in terms of human hearing are selected to be included in lower layers. A criterion used in the layer selection unit 1320 may be similar to the preset criterion used in the frequency component selection unit 1310 except that the value of a threshold corresponding to the preset criterion varies according to layers. For example, a threshold corresponding to the preset criterion for an upper layer is set to be high, whereas a threshold corresponding to the preset criterion for a lower layer is set to be low. The layer selection unit 1320 is not limited to the aforementioned embodiments of the frequency component selection unit 1310 but may use different criteria depending on a perceptual importance in terms of human hearing for each layer.

FIGS. 11A through 11C are graphs illustrating an embodiment in which the layer selection unit 1320 selects frequency components in the order from an upper layer to a lower layer according to the perceptual importance of human hearing. First, as illustrated in FIG. 11A, the layer selection unit 1320 selects frequency components located at positions 1100, 1105, 1110, and 1115 in order to serve as the most perceptually important frequency components to be included in the base layer corresponding to the first layer. Next, as illustrated in FIG. 11B, the layer selection unit 1320 selects frequency components located at positions 1120, 1125, 1130, and 1135 in order to serve as the most perceptually important frequency components to be included in the first enhancement layer corresponding to the second layer from among frequency components that remain after the frequency components included in the base layer, so that all of the frequency components selected for the base layer and the first enhancement layer are encoded. Lastly, as illustrated in FIG. 11C, the layer selection unit 1320 selects frequency components located at positions 1140, 1145, 1150, and 1155 in order to serve as the most perceptually important frequency components to be included in the second enhancement layer corresponding to the third layer, so that all of the frequency components selected for the base layer and the first and second enhancement layers are encoded.

Alternatively, referring back to FIG. 13, the layer selection unit 1320 may select the frequency components selected by the frequency component selection unit 1310 on the basis of a frequency, that is, in the order from a low frequency to a high frequency, so that the selected frequency components are included in each layer. This selection is illustrated in FIGS. 12A through 12C. Referring to FIG. 12A, frequency components located as a position 1200, corresponding to frequency components provided to a low frequency band which is important in terms of human hearing, are selected to be included in the base layer corresponding to the first layer. Referring to FIG. 12B, frequency components located at a position 1210, corresponding to frequency components provided to a band next to the low frequency band, are selected to be included in the first enhancement layer corresponding to the second layer. Referring to FIG. 12C, frequency components located at a position 1220 (labeled 1230 in FIG. 12C), corresponding to frequency components provided to a high frequency band, are selected to be included in the second enhancement layer corresponding to the third layer.

Referring back to FIG. 13, the parameter calculation unit 1330 calculates a parameter of frequency components that remain after excluding the frequency components encoded in the layers higher than the i-th layer and the frequency components selected for the i-th layer by the layer selection unit 1320. Examples of the parameter include the energy value of the remaining frequency components included in each subband, parameters indicating the noise level and envelope of each subband, and so on. For example, the parameter calculation unit 1330 may calculate an energy value for each subband of the frequency components that remain after excluding the frequency components encoded in the layers higher than the i-th layer and the frequency components selected for the i-th layer.

The layer encoding unit 1340 encodes the frequency components selected for the i-th layer by the layer selection unit 1320 and information about the locations of the frequency components into the i-th layer and parametrically encodes the parameter calculated by the parameter calculation unit 1330 into the i-th layer.

The layer selection unit 1320, the parameter calculation unit 1330, and the layer encoding unit 1340 repeat their operations until all of the layers, from the base layer to the last layer, are encoded.

The multiplexing unit 1360 scalably multiplexes all of the encoded layers, from the base layer to the last layer, which are encoded by the layer encoding unit 1340, so as to generate a bitstream, and outputs the bitstream via an output port OUT.

Figure 14:
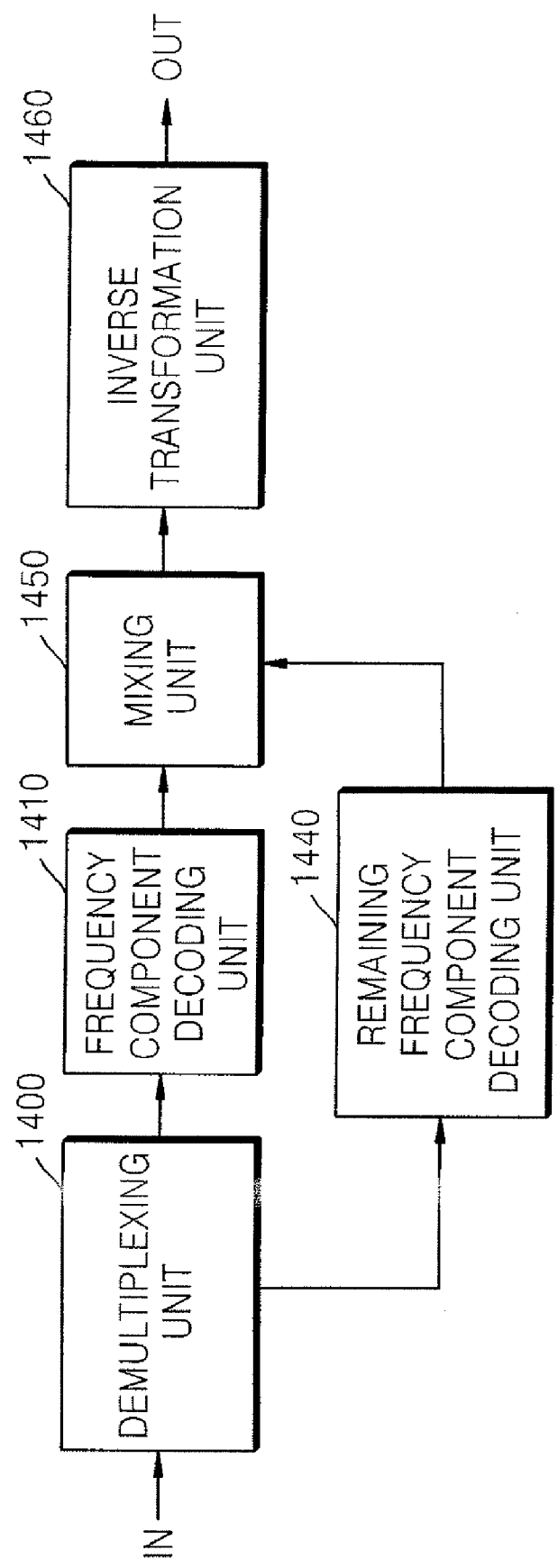
FIG. 14 is a block diagram illustrating a scalable decoding apparatus according to another embodiment of the present general inventive concept.

FIG. 14 is a block diagram of a scalable decoding apparatus according to another embodiment of the present general inventive concept. Referring to FIG. 14, the scalable decoding apparatus includes a demultiplexing unit 1400, a frequency component decoding unit 1410, a remaining frequency component decoding unit 1440, a mixing unit 1450, and an inverse transformation unit 1460.

The demultiplexing unit 1400 receives a bitstream scalably encoded by an encoder via an input port IN and demultiplexes the bitstream.

The frequency component decoding unit 1410 decodes frequency components included in an i-th layer demultiplexed by the demultiplexing unit 1400. Here, the value 'i' is set as an initial value of 1. Accordingly, the frequency component decoding unit 1410 first decodes the most perceptually important frequency components included in a base layer corresponding to a first layer. If a decoding end receives a first enhancement layer corresponding to a second layer, the frequency component decoding unit 1410 decodes frequency components that are included in the first enhancement layer and are of secondary importance to the frequency components included in the base layer.

For example, referring to FIG. 10, when only the basic layer corresponding to the first layer is decoded in operation 910, only the frequency component SC0 provided at a location illustrated in the block 1010 is decoded. '0' illustrated in FIG. 10 denotes locations of frequency components not decoded by a decoder. When the frequency component decoding unit 1410 decodes the basic layer and the first enhancement layer corresponding to the second layer, the frequency components SC0 and SC1 provided at locations illustrated in the block 1020 are decoded. When the frequency component decoding unit 1410 decodes the basic layer, the first enhancement layer, and the second enhancement layer corresponding to the third layer, the frequency components SC0, SC1, and SC2 provided at locations illustrated in the block 1030 are decoded. When the frequency component decoding unit 1410 decodes the basic layer, the first and second enhancement layers, and the last layer corresponding to the fourth layer, all of the frequency components SC0, SC1, SC2, and SC3 selected and encoded by the encoder, as in the locations illustrated in the block 1040 are decoded.

If the encoder selects and encodes frequency components for each layer in the order from an upper layer to a lower layer according to perceptual importance, the frequency component decoding unit 1410 performs decoding as illustrated in FIGS. 11A through 11C. First, when the frequency component decoding unit 1410 decodes only the basic layer corresponding to the first layer, the frequency components provided at the locations 1100, 1105, 1110, and 1115 are decoded as illustrated in FIG. 11A. Next, when the frequency component decoding unit 1410 decodes the basic layer and the first enhancement layer corresponding to the second layer, the frequency components provided at the locations 1100, 1105, 1110, 1115, 1120, 1125, 1130, and 1135 are decoded as illustrated in FIG. 11B. Lastly, when the frequency component decoding unit 1410 decodes the basic layer, the first enhancement layer, and the second enhancement layer corresponding to the third layer, the frequency components provided at the locations 1100, 1105, 1110, 1115, 1120, 1125, 1130, 1135, 1140, 1145, 1150, and 1155 are decoded as illustrated in FIG. 11C.

If the encoder selects and encodes frequency components for each layer on the basis of a frequency, that is, in the order from a low frequency to a high frequency, the frequency component decoding unit 1410 performs decoding as illustrated in FIGS. 12A through 12C. First, when the frequency component decoding unit 1410 decodes only the basic layer corresponding to the first layer, the frequency components in a low frequency band provided at the location 1200 are decoded as illustrated in FIG. 12A. Next, when the frequency component decoding unit 1410 decodes the basic layer and the first enhancement layer corresponding to the second layer, the frequency components in a band next to the low frequency band provided at the locations 1200 and 1210 are decoded as illustrated in FIG. 12B. Lastly, when the frequency component decoding unit 1410 decodes the basic layer, the first enhancement layer, and the second enhancement layer corresponding to the third layer, the frequency components including from the low frequency bands to high frequency bands, corresponding to frequency components encoded at the locations 1200, 1210, and 1220 (labeled 1230 in FIG. 12C) by the encoder, are decoded as illustrated in FIG. 12C.

The frequency component decoding unit 1410 repeats its operation until all of the layers, from the base layer to the last layer, which are demultiplexed by the demultiplexing unit 1400, are encoded.

The remaining frequency component decoding unit 1440 parametrically decodes the remaining frequency components corresponding to the frequency components not decoded by the frequency component decoding unit 1410. Examples of a parameter decoded by the remaining frequency component decoding unit 1440 include the energy value of the remaining frequency components included in each subband, parameters indicating the noise level and envelope of each subband, and so on. For example, the remaining frequency component decoding unit 1440 decodes an energy value for each subband of the frequency components that remain after excluding the frequency components decoded for the first through i-th layers by the frequency component decoding unit 1410.

The mixing unit 1450 mixes the frequency components decoded for the first through i-th layers by the frequency component decoding unit 1410 and the remaining frequency components parametrically decoded by the remaining frequency component decoding unit 1440.

The inverse transformation unit 1460 inversely transforms a spectrum generated from the frequency components mixed by the mixing unit 1450 from the frequency domain to the time domain so as to restore the original signal, and outputs the original signal via an output port OUT.

The present general inventive concept provides a method and apparatus for scalably encoding or decoding an audio signal or a video signal.

Accordingly, the encoding can be performed so that the amount of data can be adjusted to adapt to coding environments or communications environments. The encoding can also be performed so that the present general inventive concept approaches a theoretical rate/distortion curve (R/D), so that more efficient encoding is achieved. Thus, audio signals and video signals can be encoded and decoded with high sound and image qualities even by using a small number of bits.

A signal distribution is considered after binarization is performed based on a tree structure instead of bit-plane coding. Thus, a decoding end can minimize generation of quantization errors and restore the original signal.

Moreover, only information perceptually important to human hearing is sent in advance without decreasing a bandwidth which is restored from a low layer. Therefore, the quality of sound can be increased by maintaining a relatively large frequency bandwidth and decreasing quantization noise, and the degradation of compression performance is prevented.

In addition to the above described embodiments, embodiments of the present general inventive concept can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as carrier waves, as well as through the Internet, for example. Thus, the medium may further be a signal, such as a resultant signal or bitstream, according to embodiments of the present general inventive concept. The media may also be a distributed network, so that the computer readable code is stored/transferred and executed in a distributed fashion. Still further, as only an example, the processing element could include a processor or a computer processor, and processing elements may be distributed and/or included in a single device.

While aspects of the present general inventive concept has been particularly illustrated and described with reference to differing embodiments thereof, it should be understood that these exemplary embodiments should be considered in a descriptive sense only and not for purposes of limitation. Any narrowing or broadening of functionality or capability of an aspect in one embodiment should not considered as a respective broadening or narrowing of similar features in a different embodiment, i.e., descriptions of features or aspects within each embodiment should typically be considered as available for other similar features or aspects in the remaining embodiments.

Thus, although a few embodiments of the present general inventive concept have been shown and described, it would be appreciated by those skilled in the art that changes may be made in these embodiments without departing from the principles and spirit of the general inventive concept, the scope of which is defined in the claims and their equivalents.

What is claimed is:

1. A scalable encoding method comprising:
   quantizing an input signal to generate symbols;
   extracting codewords corresponding to the symbols from among codewords to have variable lengths according to a distribution of probabilities of codes and to correspond to a plurality of prepared symbols;
   dividing each of codes of the extracted codewords in units of a predetermined length in an order from an upper bit to a lower bit and grouping the divided codewords; and
   scalably lossless-encoding the grouped codewords.

2. The scalable encoding method of claim 1, wherein the prepared codewords are based on a tree structure in which a probability that each code is prepared is allocated to each node.

3. The scalable encoding method of claim 1, wherein the lengths of the prepared codewords are determined on the basis of the statistical probabilities that the symbols are generated.

4. The scalable encoding method of claim 3, wherein:
   codewords corresponding to symbols statistically highly likely to be quantized among the prepared codewords are short; and
   codewords corresponding to symbols statistically unlikely to be quantized among the prepared codewords are long.

5. The scalable encoding method of claim 1, wherein the predetermined length varies according to groups.

6. The scalable encoding method of claim 1, wherein the grouping of the divided codewords comprises:
   sequentially extracting codes in units of the predetermined length in an order from a most significant bit to a least significant bit from the extracted codes; and
   grouping the extracted codes.

7. The scalable encoding method of claim 1, wherein the scalable lossless encoding of the grouped codewords comprises arithmetic encoding.

8. A scalable decoding method comprising:
   lossless decoding scalably encoded codes;
   extracting symbols by restoring codewords by arranging the lossless decoded codes;
   restoring symbols corresponding to codes from which symbols cannot be extracted, using a distribution of probabilities of codes that can be provided to lower bits of the arranged codes; and
   dequantizing the extracted or restored symbols.

9. The scalable decoding method of claim 8, wherein the codes from which symbols cannot be extracted are collections of codes that cannot be dequantized due to an omission of the codes corresponding to the lower bits caused by a failure in the reception of bitstreams.

10. The scalable decoding method of claim 9, wherein in the extracting of the symbols, symbols corresponding to the arranged codes are extracted from a plurality of symbols prepared corresponding to a plurality of codewords prepared so as to have variable lengths according to the distribution of the probabilities of codes.

11. The scalable decoding method of claim 10, wherein the prepared codewords are based on a tree structure in which a probability that each code is prepared is allocated to each node.

12. The scalable decoding method of claim 9, wherein in the restoring of the symbols, expected values of symbols corresponding to all codewords whose codes can be extracted as the arranged codes are restored as symbols.

13. The scalable decoding method of claim 12, wherein the restoring of the symbols comprises:
   detecting codes from which symbols cannot be extracted, from the arranged codes;
   extracting symbols corresponding to codewords whose codes can be extracted as the detected codes; and
   calculating an average value of the extracted symbols by using probabilities that the extracted symbols are prepared, and restoring the calculated average value as a symbol.

14. The scalable decoding method of claim 9, wherein the lossless decoding of the scalably encoded codes is arithmetic decoding.

15. A scalable encoding apparatus comprising:
   a quantization unit to quantize an input signal to generate symbols;
   a codeword extraction unit to extract codewords corresponding to the symbols from among codewords to have variable lengths according to a distribution of probabilities of codes and to correspond to a plurality of prepared symbols;

a grouping unit to divide each of the extracted codewords in units of a predetermined length in an order from an upper bit to a lower bit and to group the divided codewords; and a lossless encoding unit to scalably lossless-encode the grouped codewords.

16. The scalable encoding apparatus of claim 15, wherein the prepared codewords are based on a tree structure in which a probability that each code is prepared is allocated to each node.

17. The scalable encoding apparatus of claim 15, wherein the lengths of the prepared codewords are determined on the basis of the statistical probabilities that the symbols are generated.

18. The scalable encoding apparatus of claim 17, wherein:
codewords corresponding to symbols statistically highly likely to be quantized among the prepared codewords are short; and
codewords corresponding to symbols statistically unlikely to be quantized among the prepared codewords are long.

19. The scalable encoding apparatus of claim 15, wherein the predetermined length varies according to groups.

20. The scalable encoding apparatus of claim 15, wherein the grouping unit comprises:
a code extraction unit sequentially extracting codes in units of the predetermined length in an order from a most significant bit to a least significant bit from the extracted codes; and
a grouping unit to group the extracted codes.

21. The scalable encoding apparatus of claim 15, wherein the lossless encoding unit performs arithmetic encoding in order to scalably lossless-encode the grouped codewords.

22. A scalable decoding apparatus comprising:
a lossless decoding unit to lossless decode scalably encoded codes;
a symbol extraction unit to extract symbols by restoring codewords by arranging the lossless decoded codes;
a symbol restoration unit to restore symbols corresponding to codes from which symbols cannot be extracted, using a distribution of probabilities of codes that can be provided to lower bits of the arranged codes; and
a dequantization unit to dequantize the extracted or restored symbols.

23. The scalable decoding apparatus of claim 22, wherein the symbol extraction unit extracts symbols corresponding to the arranged codes from a plurality of symbols prepared corresponding to a plurality of codewords prepared so as to have variable lengths according to the distribution of the probabilities of codes.

24. The scalable decoding apparatus of claim 23, wherein the prepared codewords are based on a tree structure in which a probability that each code is prepared is allocated to each node.

25. The scalable decoding apparatus of claim 22, wherein the symbol restoration unit restores as symbols expected values of symbols corresponding to all codewords whose codes can be extracted as the arranged codes.

26. The scalable decoding apparatus of claim 25, wherein the symbol restoration unit comprises:
a codeword detection unit to detect codes from which symbols cannot be extracted, from the arranged codes;
an extraction unit to extract symbols corresponding to codewords whose codes can be extracted as the detected codes; and
a restoration unit to calculate an average value of the extracted symbols by using probabilities that the extracted symbols are prepared, and restoring the calculated average value into a symbol.

27. The scalable decoding apparatus of claim 22, wherein the lossless decoding unit performs arithmetic decoding in order to lossless encode the scalably encoded codes.

28. A scalable decoding method comprising:
lossless decoding an input signal of scalably encoded codes to generate one or more groups; and
restoring one or more codewords by extracting components corresponding to upper bits from an upper layer and components corresponding to lower bits from a lower layer and arranging each of components of the groups in an order from the upper bits to the lower bits.

29. The scalable decoding method of claim 28, further comprising:
restoring symbols according to the restored codewords, wherein the components comprises codes.

30. The scalable decoding method of claim 29, further comprising:
restoring symbols corresponding to codes of the codewords from which the symbols cannot be extracted, using a distribution of probabilities of codes that can be provided to lower bits of the arranged codes; and
quantizing the extracted or restored symbols.

31. The scalable decoding method of claim 29, wherein:
the components of the groups comprise a number of bits in order;
the codewords comprises a first codeword having first ones of the bits of the respective groups, and a second codeword having second ones of the bits of the respective groups.

32. The scalable decoding method of claim 31, wherein:
the first codeword is a first symbol; and
the second codeword is a second symbol.

33. The scalable decoding method of claim 28, wherein:
the components comprise frequency components;
the groups comprise one or more layers; and
the lossless decoding of the input signal and the restoring of the codewords comprise scalably decoding the frequency components that have been selected according to a predetermined criterion and encoded for each layer.

34. A scalable decoding method comprising:
scalably decoding frequency components that have been selected according to a predetermined criterion which is preset for human perception and encoded for each layer; and
restoring a signal from the decoded frequency components, wherein a number of the scalably encoded frequency components are frequency components, a number of which corresponds to a bitrate allocated to each layer, which have been selected according to a predetermined criterion and scalably encoded.

35. The scalable decoding method of claim 34, wherein the restoring of the signal comprises:
parametrically decoding frequency components that remain after exclusion of the selected frequency components;
mixing the decoded frequency components and the parametrically decoded frequency components; and
inversely transforming the mixed frequency components from the frequency domain to the time domain.

36. The scalable decoding method of claim 35, wherein in the parametrically decoding of the remaining frequency components, energy values of the remaining frequency components are decoded in units of a predetermined band.

37. The scalable decoding method of claim 34, wherein the scalably encoded frequency components are frequency components that have been selected from the selected frequency components according to a perceptual importance in terms of human hearing and scalably encoded.

38. The scalable decoding method of claim 34, wherein the scalably encoded frequency components are frequency components that have been selected from the selected frequency components on the basis of a frequency in an order from a low frequency to a high frequency and scalably encoded.

39. A scalable decoding apparatus comprising:

a frequency component decoding unit to scalably decode frequency components that have been selected according to a predetermined criterion which is preset for human perception and encoded for each layer; and a signal restoration unit to restore a signal from the decoded frequency components, wherein the scalably encoded frequency components are frequency components, a number of which corresponds to a bitrate allocated to each layer, which have been selected according to a predetermined criterion and scalably encoded.

40. The scalable decoding apparatus of claim 39, wherein the signal restoration unit comprises:

a remaining frequency component decoding unit to parametrically decode frequency components that remain after exclusion of the selected frequency components;

a mixing unit to mix the decoded frequency components and the parametrically decoded frequency components; and an inverse transformation unit to inversely transform the mixed frequency components from the frequency domain to the time domain.

41. The scalable decoding apparatus of claim 40, wherein the remaining frequency component decoding unit decodes energy values of the remaining frequency components in units of a predetermined band.

42. The scalable decoding apparatus of claim 39, wherein the scalably encoded frequency components are frequency components that have been selected from the selected frequency components according to a perceptual importance in terms of human hearing and scalably encoded.

43. The scalable decoding apparatus of claim 39, wherein the scalably encoded frequency components are frequency components that have been selected from the selected frequency components on the basis of a frequency in an order from a low frequency to a high frequency and scalably encoded.

* * * * *